US008473396B2

(12) United States Patent
Hausman et al.

(10) Patent No.: US 8,473,396 B2
(45) Date of Patent: Jun. 25, 2013

(54) DISTRIBUTION AND MAPPING OF FINANCIAL RECORDS FROM DATA STREAM

(75) Inventors: Andrew Hausman, Summit, NJ (US); Vyacheslav T. Rubinfine, New York, NY (US); Philip Enny, New York, NY (US); Nicholas D. Field, New York, NY (US)

(73) Assignee: Bloomberg L.P., New York, NY (US)

( * ) Notice: Subject to any disclaimer, the term of this patent is extended or adjusted under 35 U.S.C. 154(b) by 2263 days.

(21) Appl. No.: 10/218,375

(22) Filed: Aug. 14, 2002

(65) Prior Publication Data

US 2003/0126056 A1 Jul. 3, 2003

Related U.S. Application Data

(60) Provisional application No. 60/312,195, filed on Aug. 14, 2001, provisional application No. 60/358,472, filed on Feb. 20, 2002.

(51) Int. Cl.
  *G06Q 40/00* (2012.01)
  *G06Q 40/06* (2012.01)
(52) U.S. Cl.
  CPC .............. *G06Q 40/06* (2013.01); *G06Q 40/00* (2013.01)
  USPC .......................................... 705/36 R; 705/35
(58) Field of Classification Search
  USPC ....................... 705/35, 36; 395/425; 345/738
  See application file for complete search history.

(56) References Cited

U.S. PATENT DOCUMENTS

| | | | |
|---|---|---|---|
| 4,745,559 A | | 5/1988 | Willis et al. |
| 4,750,135 A | * | 6/1988 | Boilen ........................... 709/231 |
| 4,868,866 A | * | 9/1989 | Williams, Jr. ...................... 707/9 |
| 4,928,246 A | | 5/1990 | Crawley et al. |
| 4,977,555 A | * | 12/1990 | Dams ............................. 370/259 |
| 5,003,473 A | | 3/1991 | Richards |
| 5,029,104 A | | 7/1991 | Dodson et al. |
| 5,142,576 A | | 8/1992 | Nadan |
| 5,214,779 A | | 5/1993 | Barker et al. |

(Continued)

FOREIGN PATENT DOCUMENTS

| | | |
|---|---|---|
| WO | WO 00/68857 | 11/2000 |
| WO | WO 02/45321 A2 | 6/2002 |

OTHER PUBLICATIONS

Connor, Deni. "Start-up Puts an Edge on Caching," Network World, (Apr. 24, 2000), vol. 17, Iss. 17, p. 25.*

*Primary Examiner* — Kambiz Abdi
*Assistant Examiner* — Stephanie M Ziegle
(74) *Attorney, Agent, or Firm* — Jon E. Gordon; Frank J. DeRosa; Frommer Lawrence & Haug LLP

(57) ABSTRACT

Improved systems, methods, and programs for customized distribution of data, particularly financial data. Individual users of networked computer systems have the capability to select and receive data from data streams produced by sources and made available simultaneously and in standardized format to numbers of client terminals. Selected data is mapped according to individual user specifications and may be used in client applications such as databases or spreadsheets, and stored in caches until users are ready to receive it. Data may be formatted and sent back to the stream source for use in applications operated at the source. The system also facilitates checking of data integrity, in particular by comparing sequences of records sent by the source and received by the client system.

6 Claims, 20 Drawing Sheets

U.S. PATENT DOCUMENTS

| | | |
|---|---|---|
| 5,220,516 A | 6/1993 | Dodson et al. |
| 5,230,073 A * | 7/1993 | Gausmann et al. ............... 707/3 |
| 5,257,369 A | 10/1993 | Skeen et al. |
| 5,309,556 A | 5/1994 | Sismilich |
| 5,321,750 A | 6/1994 | Nadan |
| 5,339,392 A | 8/1994 | Risberg et al. |
| 5,377,354 A | 12/1994 | Scannell et al. |
| 5,404,488 A * | 4/1995 | Kerrigan et al. ............... 711/133 |
| 5,452,450 A | 9/1995 | Delory |
| 5,454,104 A | 9/1995 | Steidlmayer et al. |
| 5,623,652 A * | 4/1997 | Vora et al. ........................ 707/10 |
| 5,721,940 A | 2/1998 | Luther et al. |
| 5,749,077 A * | 5/1998 | Campbell .................... 705/36 R |
| 5,768,158 A | 6/1998 | Adler et al. |
| 5,774,879 A | 6/1998 | Custy et al. |
| 5,799,150 A * | 8/1998 | Hamilton et al. ............. 709/203 |
| 5,802,511 A * | 9/1998 | Kouchi et al. ..................... 707/2 |
| 5,815,556 A | 9/1998 | Thuresson et al. |
| 5,862,325 A | 1/1999 | Reed et al. |
| 5,895,454 A | 4/1999 | Harrington |
| 5,913,038 A | 6/1999 | Griffiths |
| 5,913,202 A | 6/1999 | Motoyama |
| 5,915,252 A | 6/1999 | Misheski et al. |
| 5,964,839 A | 10/1999 | Johnson et al. |
| 5,987,480 A | 11/1999 | Donohue et al. |
| 5,999,934 A | 12/1999 | Cohen et al. |
| 6,006,206 A | 12/1999 | Smith et al. |
| 6,014,710 A | 1/2000 | Talluri et al. |
| 6,023,694 A | 2/2000 | Kouchi et al. |
| 6,026,392 A | 2/2000 | Kouchi et al. |
| 6,029,181 A | 2/2000 | Milakovich et al. |
| 6,038,565 A | 3/2000 | Nock |
| 6,044,205 A | 3/2000 | Reed et al. |
| 6,088,747 A | 7/2000 | Cotugno et al. |
| 6,098,129 A | 8/2000 | Fukuzawa et al. |
| 6,125,388 A | 9/2000 | Reisman |
| 6,134,535 A | 10/2000 | Belzberg |
| 6,138,130 A | 10/2000 | Adler et al. |
| 6,151,608 A | 11/2000 | Abrams |
| 6,167,405 A | 12/2000 | Rosensteel, Jr. et al. |
| 6,175,832 B1 | 1/2001 | Luzzi et al. |
| 6,185,573 B1 | 2/2001 | Angelucci et al. |
| 6,192,390 B1 | 2/2001 | Berger et al. |
| 6,195,647 B1 | 2/2001 | Martyn et al. |
| 6,195,662 B1 | 2/2001 | Ellis et al. |
| 6,198,906 B1 | 3/2001 | Boetje et al. |
| 6,208,904 B1 | 3/2001 | Mullen, Jr. |
| 6,216,131 B1 | 4/2001 | Liu et al. |
| 6,233,566 B1 | 5/2001 | Levine et al. |
| 6,252,587 B1 | 6/2001 | Purple |
| 6,253,244 B1 | 6/2001 | Moore et al. |
| 6,269,369 B1 | 7/2001 | Robertson |
| 6,272,521 B1 | 8/2001 | Jablonski et al. |
| 6,281,892 B1 | 8/2001 | Long et al. |
| 6,389,402 B1 | 5/2002 | Ginter et al. |
| 2002/0023045 A1 | 2/2002 | Feilbogen et al. |
| 2002/0046043 A1 * | 4/2002 | Smith et al. ....................... 705/1 |
| 2002/0094083 A1 * | 7/2002 | Bhattacharya et al. ....... 380/231 |
| 2002/0186240 A1 * | 12/2002 | Eisenberger et al. .......... 345/738 |
| 2003/0023472 A1 * | 1/2003 | Lee et al. ........................... 705/8 |
| 2003/0030672 A1 * | 2/2003 | Hughes et al. ................ 345/765 |

\* cited by examiner

DISTRIBUTION AND MAPPING OF FINANCIAL RECORDS FROM DATA STREAM

CROSS REFERENCE TO RELATED APPLICATIONS

This application claims the benefit of and incorporates by this reference the disclosures, including all appendices, exhibits, attachments and enclosures, of U.S. Provisional Patent Application Ser. Nos. 60/312,195, filed Aug. 14, 2001 and entitled Application Program Interface for Distribution and Mapping of Financial Records from Data Stream; and 60/358,472, filed Feb. 20, 2002 and entitled Application Program Interface for Distribution and Mapping of Financial Records from Data Stream.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

The invention relates to processing financial and other data, in particular to methods, computer programs, and computer systems for customized distribution of financial data for use by individual users and applications from feeds and data streams provided by financial and other data sources.

Systems and methods for processing and transferring data using data communications networks are shown in U.S. Pat. Nos. 4,745,559 to Willis et al.; 4,750,135 to Boilen; 5,230,073 to Gausmann et al.; 5,404,488 to Kerrigan et al.; 5,815,556 to Thoresson et al.; and 6,006,206 to Smith et al.

SUMMARY OF THE INVENTION

The invention provides improved methods and systems for customized distribution of financial and other data. Individual users of applications accessed on terminals (e.g., PCs or thin clients) in a computer system or network have the capability to select standardized-format data from one or more feeds provided via the network. Selected data may be used in applications such as Excel or any other database or data-requesting programs, accessed at terminals. The applications accessed at the terminals may be resident on the terminals or on a remote computer such as a server or host.

Systems and methods according to the invention facilitate downloading and distribution of streams of financial data, such as information relating to transactions in stocks or bonds, currency exchange, and present and forward interests in energy and other commodities, from a financial data source such as the BLOOMBERG PROFESSIONAL® system to one or more networks or computer systems, for use in and/or further processing by, for example, applications such as spreadsheets run on terminals. Systems and methods according to the invention facilitate the use of such data by mapping data identified for distribution to users of applications such as spreadsheets run on client, or user, terminals into forms specified by the users for use with their applications. Data may be mapped by, for example, modifying identifiers such as record type tags associated with the data according to user specifications, modifying the order and/or format of individual data elements included in data records, deleting portions of records, associating portions of individual records with each other, and assigning to data records specific addresses within data structures useable by the applications for which the data records are mapped.

In some embodiments, inventive systems and methods further provide for mapping of data created by users into a standardized format of a source of data and for transmission of the mapped data to the data source.

One or more sources provide a stream or feed of financial data. Preferably the data has a standardized format, for example, according to the FIX protocol, and is "live": that is, fresh, and reported as close to the event as possible, e.g., in real time. For example, the stream comprises a series of data parcels, or records, each data record comprising a tag identifying the type of data and a formatted information string carrying information such as quantity and price, in a standardized series of individual elements or subrecords. The stream of data records may be continuous, semi-continuous, or intermittent. For example, in some applications data is developed in bursts, and is broadcast in bursts as well, with pauses as appropriate, as for example where pauses occur in creation or reception of data records by the source. The data stream may comprise data records related to non-financial topics as well as financial data records.

One or more programs installed in the computer system or network, for example on traders' terminals and/or trading firms' network computers, e.g., servers and host computers, and/or on servers provided by financial information providers, receive input from the respective clients, or users, (or from one or more user sub-systems associated with such clients, for example individual traders' terminals installed for trading firm clients), specifying those portions of the data stream the client or each subclient (user) wishes to receive (in the case of a larger client system, the union of all subclient requests), and a format (or table of formats) in which the user wishes the data to be mapped. Mapping can include both the order of data subrecords (a subrecord comprising one or more data elements) within individual data records and the format of the subrecords (e.g., typeface, decimal placement, scientific notation, etc.), as well as the order in which the records are routed to and stored by the requesting user. Alternatively or in addition, mapping may include the filtering of individual elements or subrecords, so that only selected elements or record subsets are received by a given user.

In a preferred embodiment, mapping assigns one or more user-specified, or user-specific, names or tags to the record, for use by an application run on a user terminal for storing, processing, and/or identifying the record. Thus mapping may comprise any formatting, filtering, and/or ordering operation, including any operation which adds tags, storage addresses, or additional data elements to the record, preferably without destroying information carried by portions of the record the user or application wishes to receive. Each single data record may be designated for receipt by and routed to any number of user terminals, and for each terminal, each user may associate one or more different tags with the record for the user's own identification and processing purposes. A single user terminal may request to receive multiple instances of a single data record, for mapping in multiple forms, as for example for use in different applications.

An information distribution program receives the financial data stream from the data stream source and identifies/selects those portions of the data stream the users wish to retain (preferably according to authorization), as for example by filtering data in the data stream according to data types. In a preferred embodiment, tag elements identifying the type of data carried by individual data records are compared to data types included in a list of record types requested by various users; the selected data is mapped into the form(s) and/or order(s) specified by the various users, so that only data records of specified types are identified for delivery to or access by requesting users. Preferably, the data is distributed to individual user-accessible terminals in formats specified by the users. Mapped, distributed data is thereafter available for use by application programs installed on the user system(s). Individual data records may be identified and/or mapped for one user, for several users, or for no users, depending upon the number of users who have specified a desire to receive the records, or records of a given type. Individual records may be mapped more than once for individual users.

Identification of data records for transfer to users can be accomplished on the basis of filtering or any other suitable process. In addition, data records may be identified by filtering or other sorting based on more than one criteria. For example, users may indicate that they wish to receive data records of a given type, and with particular element or sub-record values, or values within selected ranges. Identification may be accomplished at single or multiple programming stages. For example, a first identification may be accomplished by filtering based on record type, prior to delivery to the requesting user, with a second filtering, based on data values or value ranges, accomplished after the initial identification and transfer to (which includes both delivery to and retrieval by) the requesting user, or an intermediate point such a local client server upstream of an end user.

In one aspect the invention provides a computer system for receiving and distributing data, or various portions of it, to users of the system. The system comprises one or more computers programmed to provide, or to receive or otherwise process, formatted financial data records, identified for delivery to or access by requesting users, and programming stored on a computer readable medium at the computers, and/or at one or more of a plurality of user-accessible terminals coupled with the computers, that causes the system to map records identified for transfer to users of the computer system. Received data records are identified by the computer for transfer to the users in accordance with data indicating the data record or records that are to be delivered to each of the users, for example by identifying types of data records requested by the users. Records identified for transfer to users are mapped in accordance with data indicating mapping of the respective data records for applications such as database, spreadsheet, or other programs operable at the respective user-accessible terminals.

Computer systems according to the invention comprise, for example, one or more computers or other automatic data processors, of any suitable type(s) and/or combinations. For example, they may include server—client architectures comprising one or more server-class computers networked with one or more terminals accessible by system users. User-accessible terminals can include their own processors, as for example desktop "personal" computers ("PCs") and/or lower-powered "thin clients," coupled with input/output devices such as graphical displays, keyboards, and pointing devices; or they may be provided as "dumb" input-output terminals consisting simply of input/output and communications means; or of any suitable combinations or variations thereof. Such systems may be coupled by any suitable communications means, such as local or wide area networks ("LANs" or "WANs") or the Internet, connected by wired, wireless, or other links.

An application is operable at a user-accessible terminal when, for example, a user can use the terminal to start and control the application, and can use the application to receive, process, and optionally output data. For example, a user at a terminal comprised by a computer terminal according to the invention may start an application, the programming for which resides anywhere on his own or another terminal coupled to the network, on a WAN or LAN server, or any other computer—including for example a remote computer accessed over the Internet. Preferred systems according to the invention enable one or more users to each map individual records into multiple forms so that, for example, different users using different terminals can operate different application programs using the data, or multiple instances of the same program using the data in different forms, or any combination of such applications. Thus preferred systems according to the invention support the operation of identical or different application programs on multiple terminals, or the operation of multiple instances of the same program on one or more terminals.

Some embodiments of the invention provide programming and memory for holding and later delivery of data records identified for delivery to users who may be unready to receive them at the time they become available, but who desire to receive the records when they, or their terminals or applications, are ready. One way in which this is accomplished is to provide all data records identified for users to individual caches provided for each user, from which the identified data records are provided to the respective terminal. Any suitable protocol may be used for terminals to access data records from respective caches for both real time transfer and non-real time transfer on a push and/or pull basis. Such protocols may operate at the user, terminal, server, and/or application level. For example, if a user is logged on and is working with or monitoring an active application, or is otherwise identified as ready to receive data at a particular terminal for a particular application, data identified for delivery to that user and mapped for that application is transmitted from the cache to the terminal in real time according to a suitable protocol. Data may be deleted from the cache after it is transmitted to a user terminal, retained for a given period of time, or overwritten when the cache is full. Separate caches may be provided, for example, for each application, or instance of an application, programmed to run on a terminal, for each user, and/or for each terminal. The use of caches enables terminals to run programs other than those for which the cached data is intended without losing the data. The use of caches can also allow individual users to end and later resume application sessions, or change terminals, without losing data received during the interim. Caches may comprise separate physical memory devices such as separate disks or tape drives, separate partitioned areas in one or more joint physical memories, separate addressing schemes implemented through use of appropriate tagging of delivered and/or mapped data records; or any other suitable device(s) or scheme(s).

In some embodiments caches are assigned at a multi-user level. For example, a trading firm subscribes to a data stream from a financial data services provider. The firm receives a data stream comprised of data types the firm is authorized to receive as part of its subscription, and wishes to distribute various of portions of the stream to various individual traders, at individual computer terminals, within the firm's internal computer network. The firm or other multi-user client is assigned a single cache, and the financial information services provider puts into the cache the union of all data types requested by the firm's traders. Optionally, records written to the multi-user cache are associated with a counter or other indicator of a number of times that the record authorized to be delivered to or accessed by the multi-user client to whom the record is to be delivered. For example, if more than one trader wishes to look at a single type of data record, and/or if one or more of those traders wishes to receive multiple instances of each of a given type of data record, a counter reflecting the total number of times the data record is to be made available to the multi-user client is associated with the data record. Each individual data record is stored with the associated indicator for that record type, and after the client has received or accessed an individual data record the indicated number of times, further access to the data record is disabled. Optionally data records are deleted from the cache as their access limits are exhausted; otherwise they may be overwritten or retained until a periodic or requested cache clean-up command is implemented.

In another embodiment, systems and programming according to the invention further facilitate transfer of data from the data-receiving client system back to the data source. For example, data records mapped in client-specified formats may be sent as input back to the system that provides the data (the "source" or "server" system). In such cases, client-stored or client-created data records are remapped by the program into a format useable by or otherwise consistent with the source system, or applications accessible from or through the source system, and forwarded to the source system via the communications link. For example, the client data can be mapped into a format consistent with the format used within the formatted data stream received from the stream source, and thereafter forwarded to the stream source for use as input. Optionally the stream source system can map data forwarded from client systems into still other formats for use by applications associated with or otherwise accessible through the source system.

Data handled by systems and programs according to the invention may be checked for integrity, as for example by conventional data checking methods such as parity checking, at the source and/or applications level. Preferably, checks include data types, such as checks for integer values where integer values should be, for text strings, characters, and decimal values, etc. Sequence number schemes are provided for verifying that data packages transferred between the source system and client systems, and vice versa, are received intact. A look-aside buffer is provided for backing up data sent to or from the stream source during one or more connection sessions. Preferably, the system makes data integrity checks by at the application level. Such data integrity checks may include, for example, checks for missing elements and/or values in record elements, missing or incompatible data type records, incorrect data types (e.g., integer, decimal, etc.), and discontinuous or interrupted data records.

Among sequence-checking schemes used according to the invention are schemes in which the system receiving the data maintains a sequence listing for all records received from the data source, for comparison with a sequence listing maintained by the source, and making a determination that an error has been made when the compared listings are not the same. Comparison may be made by the client system, the source system, or both, or by a combination thereof. The comparison may be made automatically, for example on a periodic basis, or upon request, for example on request of any user or application, on either the receiving or source side. One means of initiating the resending can be the deliberate sending, by either the receiving or source systems, of an out of sequence indicator. For example, the periodic sending of an out of sequence indicator can be used to trigger periodic integrity checks without a necessity for continuous sequence monitoring, particularly on a record by record basis. For example, the comparison can be made by the deliberate sending of an out of sequence record, or by deliberately modifying the sequence of data records maintained by the computer system. Thus in another aspect the invention provides a computer system for receiving data and distributing received data to a plurality of users of the computer system with error detection using such schemes.

In another aspect the invention provides a program structure installable in a client computer system, the program structure, e.g., when installed, being useable for identifying within a stream of formatted financial data records received from a data stream source a plurality of data records, each identified data record routable or otherwise deliverable to a plurality of users of the client computer system, and for mapping each of the identified data records into a plurality of forms designated by the users. The program structure may comprise a complete, stand-alone computer program, a set of programming modules or objects, or any combination of software, firmware, and/or hardware suitable for the purposes described herein. For example, either conventional software systems or dedicated logic circuits will serve satisfactorily. The program structure may be installed entirely on a client server computer or may be installed partially on a server and partially on one or more individual user terminals. For example, mapping of data records routed to a user may be accomplished wholly or in part by program structures installed on the user's terminal, after the data has been routed to the user by the server.

The invention applies both to point-to-point dedicated server-client systems, and to multi-cast systems. Both point-to-point and multicast systems can further comprise subclient systems associated with client systems. A single client system may comprise any number of subclients.

Optionally, data of interest is identified by the user, and selected from the data stream, through use of the record-type tag portions, or elements, of the individual data records. Thereafter, formatted subrecords of individual data records can be mapped/translated into the format(s) specified by user.

A communications link communicates the data stream from the stream source to the user system and, optionally, back. Such a communications link can comprise, for example, private or public computer networks such as the BLOOMBERG PROFESSIONAL® private computer and communications network and/or the Internet, and combinations of local and wide area networks.

The invention further provides systems for the distribution of financial data among users of one or more computer systems. For example, one preferred system according to this aspect of the invention comprises a source for a stream of financial data records in a standard format, the source being communicatively linked to at least one client computer system; and programming and systems as disclosed for receiving, distributing, and mapping such data on the client system as described herein.

The invention further provides methods of distributing financial data among a plurality of users of a computer system, as described herein, and programming, stored on a computer readable medium or media, for implementing the methods described herein on one or more computer systems. Methods described herein are not generally described in any certain required order. Except as herein otherwise expressly stated, or inherently required by the methods themselves, steps in any methods or processes described herein may be interchanged.

The invention includes software implemented on computers or other appropriate hardware, including such other intelligent data processing devices having a processor, data storage means, and the ability to support an operating system, with or without user interfaces, for example, file servers, as may be useful in achieving the objectives of this invention. Software components and applications embodying the invention can be provided in electronic bit storage on magnetic, optical, bubble, or other media, and optionally in transportable form to be interactive with an electronic reading device, for example, on computer or optical diskettes, or may be distributed over wired or wireless networks for storage by the recipient on such media.

As used herein, a user is any recipient of requested data. This can include, for example, both individual end users, such as individual traders at a financial trading firm, and client servers or administrators, including all subclient users.

To transfer data is to provide data held at one location in a second location. Transferring data can include, for example, releasing or delivering data to, or allowing or enabling access of data by, a user at a second computer or terminal, or any other method of making data available to the user.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

BRIEF DESCRIPTION OF THE DRAWINGS

The invention is illustrated in the figures of the accompanying drawings, which are meant to be exemplary and not limiting, in which like references are intended to refer to like or corresponding parts, and in which:

FIGS. 6-29 are diagrams of graphical user interface screens presented to users of data streaming, distribution, and mapping systems according to the invention.

DETAILED DESCRIPTION OF THE PREFERRED EMBODIMENTS

Figure 1A:
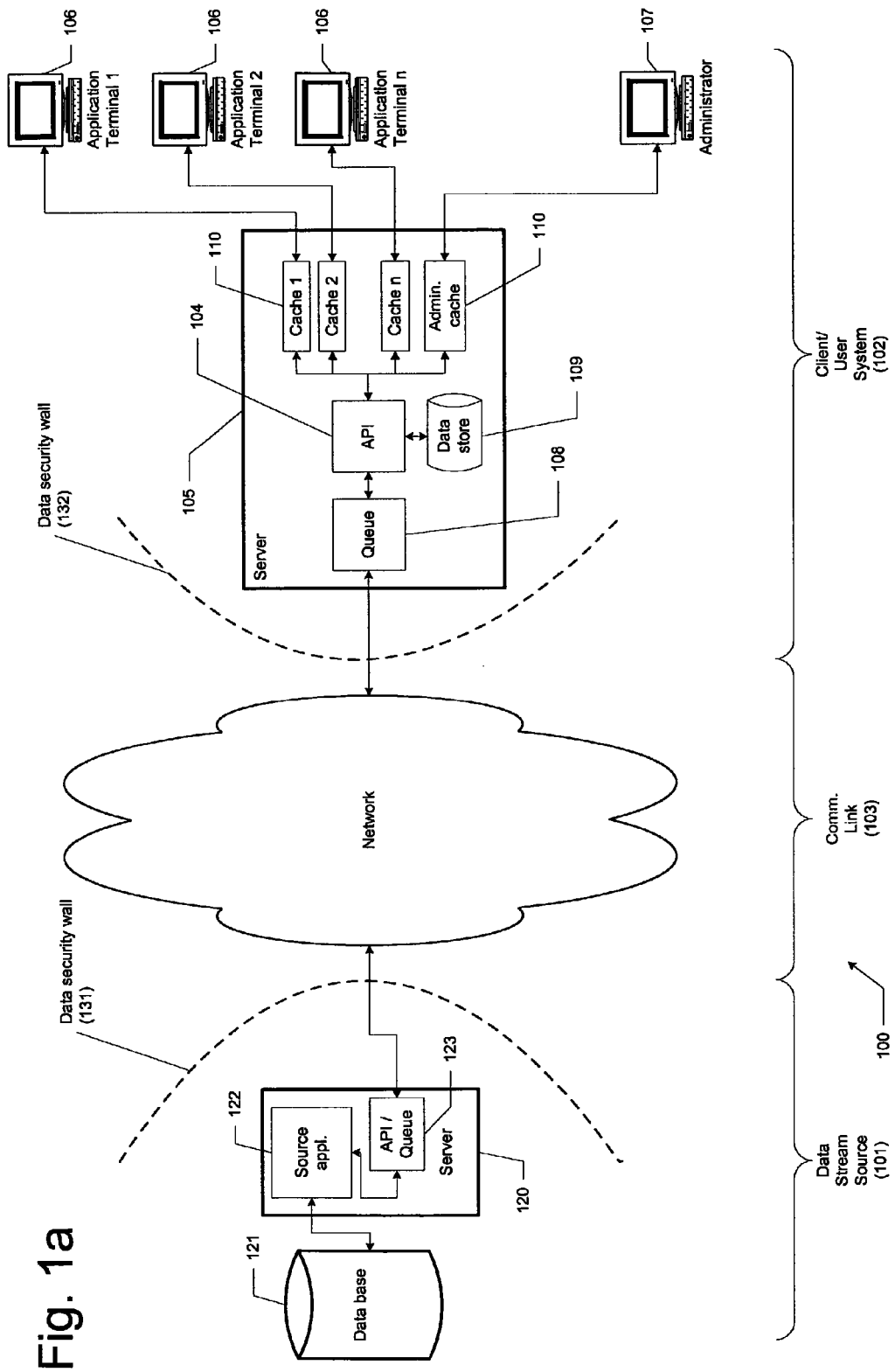
FIG. 1a is a schematic diagram of a preferred embodiment of a system for mapping and distribution of financial data according to the invention.

FIG. 1a is a schematic diagram of a preferred embodiment of a system for mapping and distribution of financial data according to the invention. System 100 comprises data stream source 101 and at least one client or user system 102. Stream source 101 and client system 102 are linked by communications link 103.

Data stream source 101 comprises a server or server system 120, such as a Bloomberg L.P. financial data services server, which is associated with one or more data bases 121. Server system 120 comprises one or more source application systems 122, such as the BLOOMBERG PROFESSIONAL® system, including the BLOOMBERG TRADEBOOK®, BLOOMBERG BONDTRADER®, SPEX™, BLOOMBERG Municipal Bids Wanted, or BLOOMBERG POWERMATCH® trading systems; and queue 123. Data created and processed by application(s) 122, and optionally stored within database(s) 121, is forwarded to queue 123 and entered into a preferably continuous, semi-continuous, or intermittent live data stream. Preferably, data is entered into the data stream on a first come, first streamed basis. Data is preferably received live from system applications 122 by queue 123; delimiters are inserted, if necessary, between records and optionally between individual elements within records, as for example according to the FINANCIAL INFORMATION EXCHANGE PROTOCOL (FIX) described in a document entitled FINANCIAL INFORMATION EXCHANGE PROTOCOL (FIX), Version 4.2 with Errata 20010501, published May 1, 2001, by FIX Protocol Limited; and data is sent to or made available for reading by client systems. As soon as data has been formatted in the proper format within the queue, records, separated by delimiters, are sequentially broadcast (as for example by writing them to a communications buffer for sending to users logged on to a stream receiving system, or otherwise identified as recipients, or made available for reading by the client systems), to client systems that have been enabled and/or authorized to receive them.

Data entered into the stream may be originated by data source 101, received from outside sources such as financial news or data transmission sources, or compiled from any combination(s) of such sources.

From queue 123 the data stream is forwarded, broadcast, or made simultaneously available (as for example by posting via a data base 121) to at least one client and preferably a plurality of client systems 102 via communications link 103. Communications link 103 comprises any combination of local and wide-area, private and public networks or other connections that is suitable for the purpose. For example, communications link 103 can comprise the Internet, with both source system 101 and client system 102 comprising independent private local-area networks, all joined by telecommunications systems such as telephone lines. A further example would be to include both source 101 and client systems 102 in a private network using modems and dedicated communications lines, and/or wireless devices.

Optionally, at either or both ends of communications link 103, that is, on leaving source 101 and entering client system 102, and/or vice versa, the data stream passes through data security wall(s) 131, 132 to ensure the security of the client and/or source systems 102, 101. Security walls 131, 132 may incorporate any suitable security systems or devices, including computer "virus" checks and encryption/decryption processes.

Client system 102 comprises client server 105, a plurality of user-accessible terminals 106, and optional client administrator system 107. Client server 105 comprises application program interface (API) 104, queue 108, data store or archive 109, and a plurality of cache memories 110, such as one cache 110 for each user terminal 106. API 104 comprises programming causing client system 102 to select, deliver, and optionally map data records received or retrieved in a stream from source 101. Optionally programming for mapping data records identified for delivery by API programming resident on client server 105, and for requesting that API 104 identify and route such records, resides and/or operates wholly or partially on user terminals 106, as for example in association with one or more client applications resident on terminals 106. Data from source 101 is received through queue 108. Individual caches 110 may be provided for individual users of client system 102, as for example for individual subclient terminals 106 or for individual user applications installed or operated on subclient terminals 106 or operated by individual users of system 102, or on any other suitable basis.

API 104 causes client server 105 to receive from user terminals 106, from administrator 107, or elsewhere, and preferably retains (e.g., controls storage of), data indicating types or classes of data to be selected from the data stream and delivered to users of terminals 106, and optionally information for mapping and translating selected data into requested format(s) for use by applications operable on user terminals 106. Where more than one user has requested data, or where more than one mapping of data (e.g., from a single user, for use with multiple applications) has been received, API 104 causes server 105 to compile and preferably retain a master identification and mapping table, including a list of all desired data record types and mappings.

As queue 108 receives and forwards the data stream, API 104 reviews data records included within the stream, as for example by reading data type codes included as elements in the records and comparing them to client and/or subclient request lists; and selects, as for example by assigning suitable identification tags to the records, or by writing them to a cache, buffer or other, preferably volatile, memory, data records requested by users served by the API. Records are tagged, associated with user cache addresses, or otherwise identified for routing to such users as have requested them. Some records may be requested by more than one user and/or requested multiple times by a single user.

Optionally, API 104 compiles a master archive of all received records, or of all received records in which an interest has been expressed by any user(s) of client system 102, for use in supplying any such records later requested by client system users, and compiles a record sequence listing for use in error checking, to determine whether any records sent by source 101 have not been correctly received by client system 102.

Individual selected data records are optionally mapped according to user requests by API 104, either before or after forwarding to caches 110. Caches 110 hold the records, if the users to whom they are addressed are not ready to receive them, and forward them when the users have indicated, as for example, by logging onto the client network, that they are ready.

Whether installed in client server 105, user terminals 106, 107, or distributed between them, API 104 formats (or re-formats), i.e., maps, records into any form(s) requested by the individual user(s), as for example by re-ordering, deleting, editing, and/or adding elements within the information strings carried by the records. In some embodiments a client system is enabled to designate a single mapping for each data record, or for each distinct type of data record, so that each subclient user, if present, shares a common mapping. In other embodiments each subclient is enabled to designate his/her own mapping, and optionally multiple mappings, for each data record or each distinct type of data record.

API 104 can associate with or incorporate as part of a master listing of user data type requests a table or other listing of mappings requested by various users for various applications.

Upon receipt by the individual users, the data is ready for use or further processing by client or subclient applications such as spreadsheets or trading programs.

Preferably, as records from the data stream are received by queue 108 and forwarded to API 104, they are also copied to archival data store 109. Data store 109 is used to provide a backup of received in case of failures in client system 105 or user systems 106, 107, and for error checking, to ensure that all records provided by stream source 120 are received by API 104. Records are copied to archival data store 109 in any suitable fashion, preferably in the order received and as associated with a sequence listing.

Figure 1B:
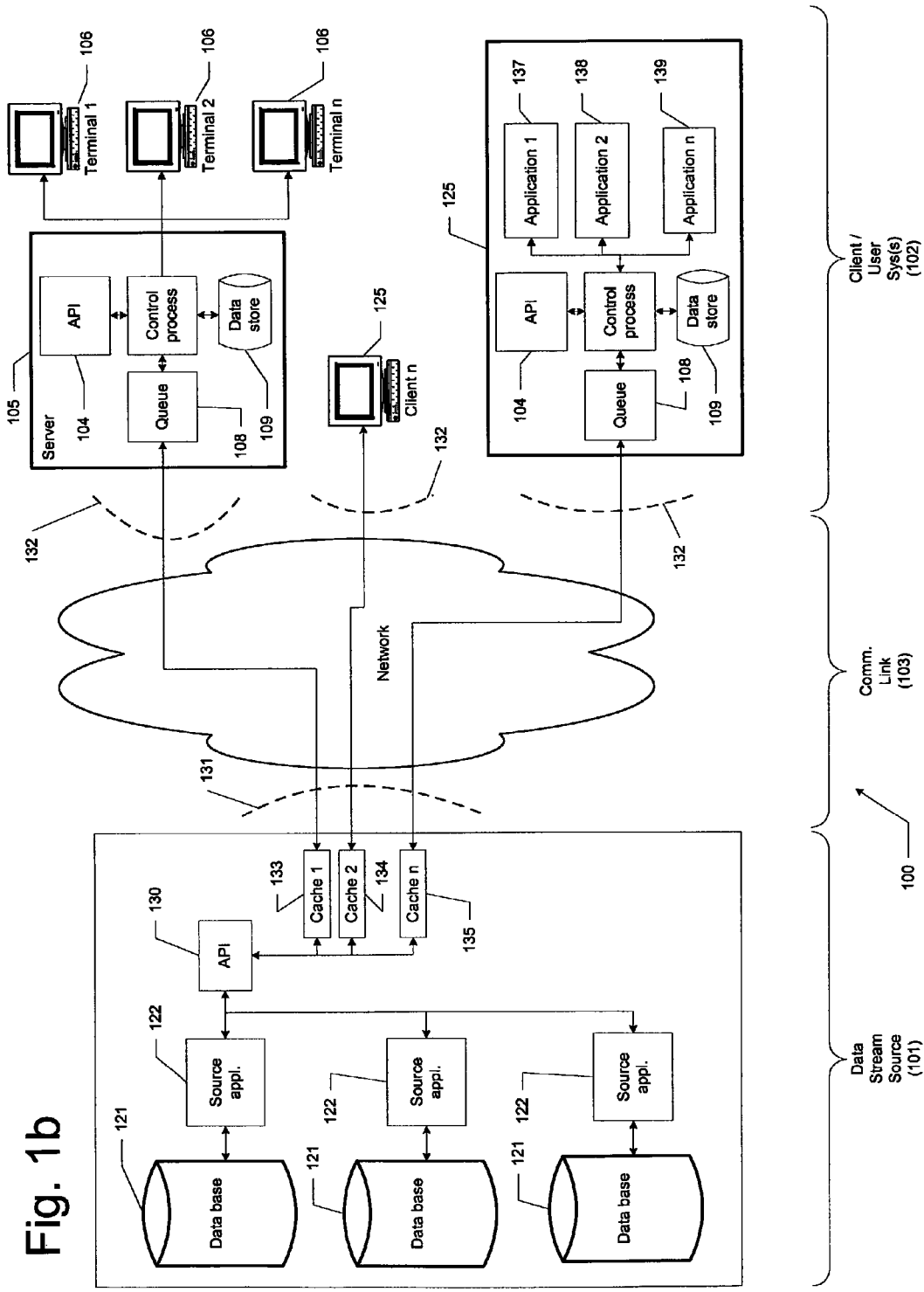
FIG. 1b is a schematic diagram of an alternative preferred embodiment of a system for mapping and distribution of financial data according to the invention.

FIG. 1*b* is a schematic diagram of an alternative preferred embodiment of a system for mapping and distribution of financial data according to the invention. Data stream source system 101 comprises a plurality of source applications 122 and databases 121, as well as a plurality of various types of client/user systems 102. Each of client/user systems 102 is enabled to select which one or more of source applications 122/databases 121 it wishes to receive data from. In general, individual users at terminals 106, 125, 126 may elect to receive data from one or more of source applications 122/databases 121. Requests for receipt of record types, and mapping of selected record types, are forwarded to servers 105, APIs 104, and/or source APIs 130. Source API 130 compiles a unified listing of all user data requests and optionally all or some mapping requests, and forwards selected and/or mapped data to user/multi-user caches 133, 134, 135.

Client/user systems 102 can comprise any combination of local server—terminal systems 136 and individual computers 125. Individual user terminals 106, 125, 126 can each operate one or more applications 137, 138, 139; and may receive various types and mappings of data for each application, independent of each other.

Figure 2:
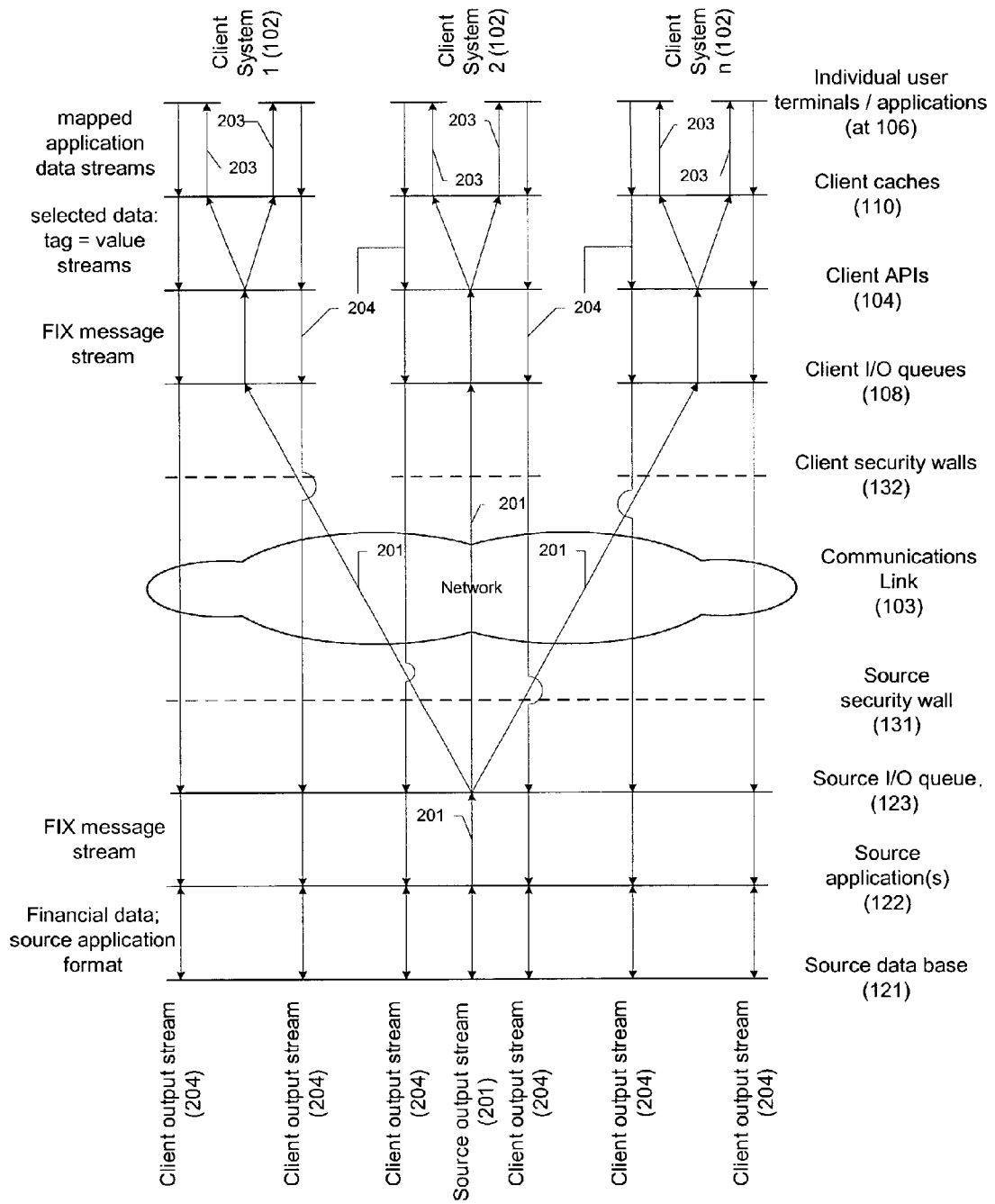
FIG. 2 is a schematic diagram of a data flow according to a preferred embodiment of a method of mapping and distributing financial data according to the invention.

FIG. 2 is a schematic diagram of a data flow according to a preferred embodiment of a method of mapping and distributing financial data according to the invention, consistent with the employment of a system such as that shown in FIG. 1*a*.

One or more source applications 122 process data received from client systems 105, data base(s) 121, outside news and information sources (not shown), and/or originated within source applications 122 themselves. Data used, manipulated, and/or processed by source applications 122 is optionally stored within and retrieved from source data base(s) 121. Source output stream 201 is formed by forwarding from source applications 122 discrete data records to source I/O queue 123. Records received from the application are tagged, either by the applications themselves, by a function within the queue, or otherwise, to identify the type of data described by the record (e.g., offering of a security or commodities contract), and delimiters or other separators are inserted between records. Optionally, delimiters are further inserted between individual items or elements of data records.

As soon as data records have been suitably formatted and placed within the queue, separated by delimiters, they are sequentially broadcast (as for example by writing them to one or more communications caches or buffers for sending via telephone communications lines to clients logged on to a receiving computer system, or for reading by such clients), or otherwise made simultaneously accessible in the form of a data stream, to a plurality of client systems 105, by passing them through optional source security wall 131 and client security wall 132 via communications link 103.

Data stream 201 is received by (or accessed and read into) client I/O queues 108, and passed to client APIs 104, where it is reviewed and selected records are mapped and distributed via mapped data streams 203 to individual users 106 as described above. Records are selected for distribution to various system users, for example, on the basis of their type.

Optionally, the process is employed in reverse to form user output streams 204, which are written back through APIs 104 and I/O queue 123 to source application(s) 122 and database 121, for further processing by the source.

Example message format types used during various stages of the process are shown in the left column of FIG. 2. Data written to and from source database 121 are in suitable format for whatever source applications 122 data source 101 is running. Output from the source I/O queue, and optionally from the source application to the data stream, are in a standardized format such as the FIX protocol. Between the client APIs and client mapping routines, the data selected data remains in standardized format; on being sent from the mapping routine to the client applications the format is in user-requested application format.

Figure 3:
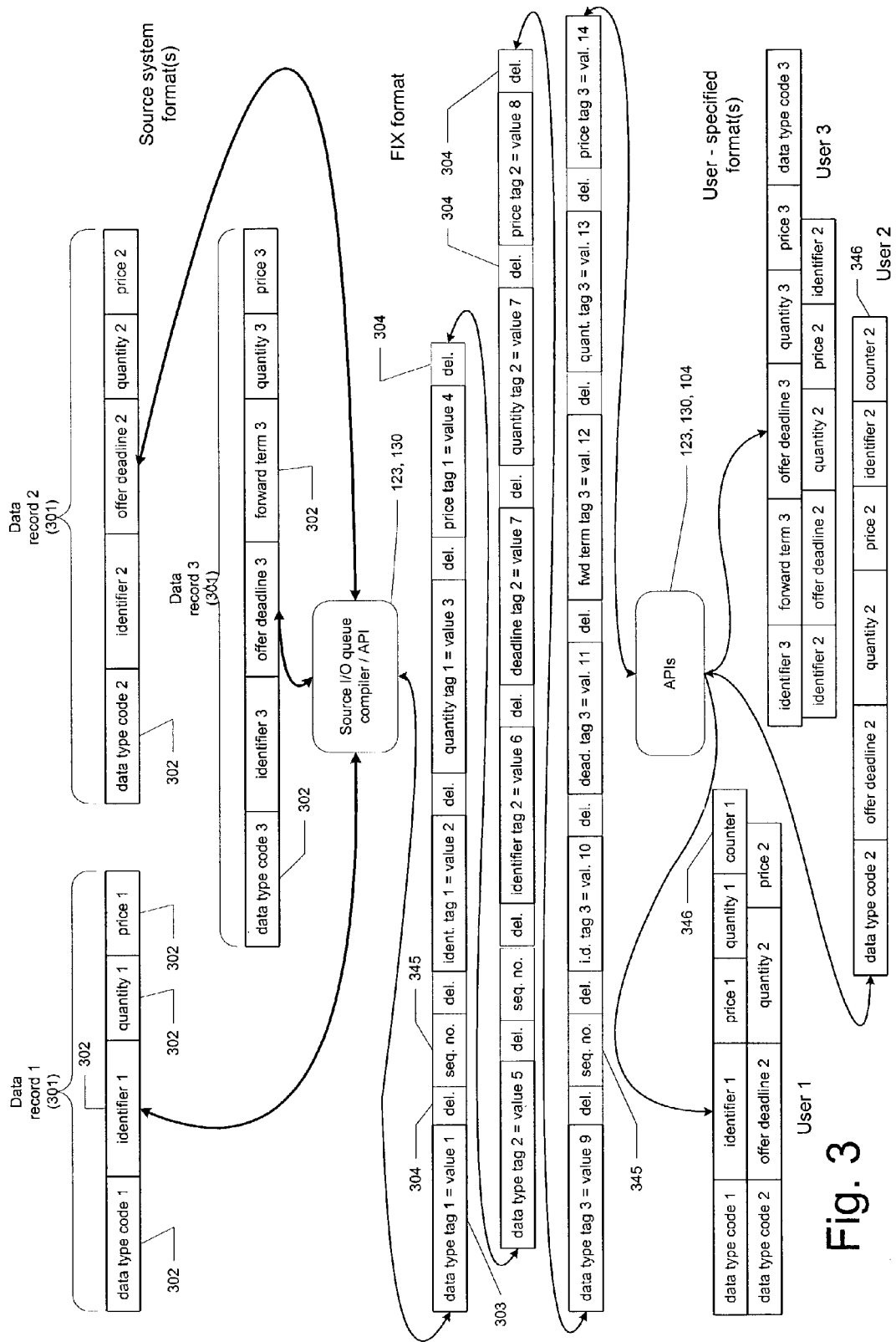
FIG. 3 is a schematic diagram of a streaming, distribution, and mapping of data according to a preferred embodiment of a method of mapping and distributing financial data according to the invention.

FIG. 3 is a schematic diagram of a streaming, distribution, and mapping of data according to a preferred embodiment of the invention. Individual data records 301 comprise a number of individual data items or elements 302, such as a data type code, an identifier, a quantity, a price, a deadline, and/or a forward term. For example, a data record might include a data type code indicating that the record pertains to an offering for a corporate equity lot, and an identifier indicating that the bond offering is for IBM common stock, a quantity indicating that the offer concerns a block of 30,000 shares, and a price indicated in terms of dollars per share. Other data records and type codes may relate, for example, to bond offerings, futures contracts, or other instruments or commodities. Upon being created by source applications, data records 301 may be in individual or various source application formats.

As records 301 are received from or produced by source applications 122, or are otherwise passed to source queue 123, records in non-standard formats are preferably placed by the source server into a standardized format, such as the FIX Financial Information eXchange Protocol being developed by the FIX Protocol Organization (www.fixprotocol.org) and routed to client servers. For example, each element within the record or parcel can be formatted as a tag with an associated value, as shown by elements 303. Preferably records are assigned sequence numbers in the order of their receipt and/or the order of their transfer to output queue 123 or source API 130, and sequence number elements 345 are inserted as elements within each record's header, which typically comprises data type code elements and optionally other data. Preferably also delimiters 304 are inserted between individual elements 303 and between records. Standard-format records are written to queue 123 as they are received, and sequentially forwarded or made simultaneously available as a data stream 201 to a number of client or subclient systems 102, 106 via client I/O queues 108 and APIs 104, preferably as a live, continuous data stream. Preferably source server 120 compiles a listing of record sequence numbers as records are written to client systems, for use in monitoring of data transfer and error checking.

Data stream 201 is output from source API/queue 123 or API 130, and received by client systems 102, in standardized format. Optionally source system 101, (in particular API 130 or API/queue 123) also provides records 301 with tag/field elements, or otherwise associate them with, counters indicating the total number of times a user 102 is authorized to receive or otherwise access them. For example, if a user 102 has subscribed to receive equity feed data, with up to 500 copies of each record, a counter 346 with a value of 500 is associated with the relevant records 301. Thereafter, for example, each time a user system 102 receives or otherwise accesses the data record, counter 346 is incremented or decremented until the record has been accessed to its authorized limit.

Source 101 feeds records from data stream 201 to API(s) 104 and/or caches 133, 134, 135, preferably in the order and at the time received. Preferably queue 108 and/or API 104 also copy the entire received data stream, as received in standardized form, to archival data store 109, and compile a record sequence listing for use in monitoring of data transfer and error checking, by reading sequence elements embedded within the records and maintaining a sequential listing of them. Individual records are identified by the API according to a list or lists of client-requested record types, associated with routing or address tags or otherwise prepared for delivery to requesting users, and optionally delivered to user caches 110. Records are further mapped, and optionally further filtered, according to the user requests, according to the mapping routine, and written to or read from caches 110 by the appropriate user system(s). Routing tags and counters, where used, may or may not form separate additional elements within the various data record(s); they may be associated as separate data elements recorded separate from the records within, for example, client server or administrator systems.

In the example of FIG. 3, data stream 201 comprises three data records 301. Record 1 includes a type code element (e.g., "bond"), an identifier element (e.g., issuer and maturity), and quantity and price elements. Data record 2 comprises elements of these same types (type code, identifier, quantity, and price) and an offer deadline. Data record 3 further comprises a forward term element, as for example of the type used in trading energy or commodities. Each of the data records includes elements in differing, non-standardized order, as might be expected in receiving data from a variety of source applications. At source I/O queue compiler 123 or source API 130 the records are formatted into a standard tag=value format, with elements separated by delimiters 304, and in standardized order. A sequence number element 345, assigned to each record in the order in which it is output by the source, is inserted. The order of data elements includes, for example, data type, sequence number, identifier, deadline (if any), forward term (if any), quantity, and price. In general, each of the values 1-14 is independent of the others. For example, quantity 1=value 3 and is not necessarily equal to quantity 2=value 7; or to quantity 3=value 13. Moreover, the data records are placed into a continuous string, each record separated from the others by a delimiter 304. In this form, or optionally after mapping per user requests, stream 201 is forwarded to one or more client systems 102, optionally via caches 133, 134, 135.

At client system 102 each record is copied to an archival storage and the sequence number is added to the listing of received records. If not already accomplished at source 101, the data type code is read and compared to a listing of data types requested by client users; each record of a requested type is routed to each user that requested it by writing to user caches 110. Optionally selected records are mapped into forms specified by the requesting users, either by source 101 or client server 105 prior to or during routing to the requesting users, or by users 106 after routing. Optionally too records identified for specific users are filtered according to criteria established by the users. For example, a given user may wish to see only stock offerings related to IBM issues; all other records of type "stock offering" would be filtered out of that user's data stream.

In the example of FIG. 3 user 1 has requested records of the types exemplified by data records 1 and 2; user 2 has requested records of the types exemplified by data record 2;

and user 3 has requested records of the types exemplified by data records 2 and 3. User 1 has requested, for records of the type of record 1, that the type code element be followed by the identifier, quantity, and price elements, in that order; and for records of the type of record 2 that the type code element be followed by the offer deadline, quantity, and then price elements. User 2 has requested only records of the type of record 2, with the type code element being followed by the offer deadline, the quantity, the price, and then the identifier elements. User 3 has requested that for records of the type of record 3 the identifier element be followed by a forward term element, a deadline element, quantity, price, and type code elements; and for records of type 2 that the identifier element be followed by deadline, quantity, price elements, and a repetition of the identifier, the type code element being omitted. Thus the order of several elements within data records 1, 2, and 3 have been changed. At the request of the user, elements within records may be deleted, added, or edited.

Figure 4:
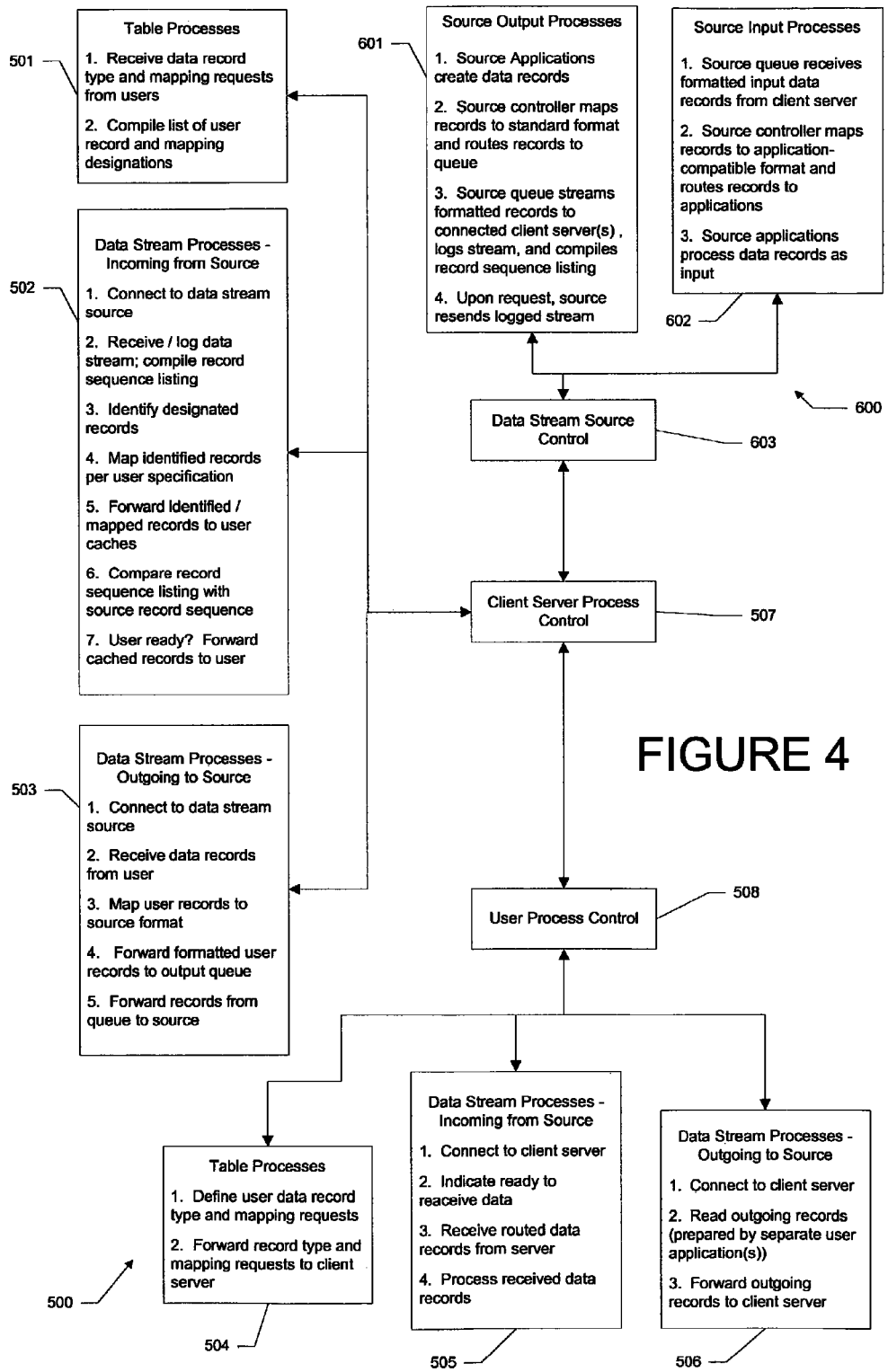
FIG. 4 is a functional diagram of a program structure for streaming, distribution, and mapping of data according to the invention.

FIG. 4 is a functional diagram of a program structure for distribution and mapping of data according to the invention. API program structure 500 works in conjunction with source program structure 600 and comprises program structures 501 for server table or listing processes, 502 for server incoming stream processes, and 503 for server output stream processes; and 504 for user or user terminal listing or table processes, 505 for user or terminal incoming stream processes, and 506 for user or terminal output stream processes. A system or program structure according to the invention can comprise multiple instances of user or user terminal processes 504, 505, 506, and associated user control processes 508.

Generally API program structure 500 works in conjunction with a source process 600, though there need be no direct interaction between them. It is generally sufficient that API program structure 500 be capable of receiving and processing a standardized-format data stream provided via source process 600, and optionally for sending data back to the source, generally with the aid of the source process. In any case, however, the function of source process 600 is described here for clarity.

Protocols, commands, and user/administrator inputs, authorizations, and other control and coordination tasks are facilitated by source control process 603, client server process control 507, and client user process control 508. Any suitable process control language(s) or program structure(s) will serve. Those skilled in the art of designing such systems will not be troubled in identifying suitable processes once they have been made familiar with this disclosure. For example, operating systems such as UNIX or WINDOWS may be made to serve.

Source stream output processes 601 (included by, for example, APIs 123, 130) provide for the creation and/or collection of data records from applications associated with the source, and/or from sources of financial data such as financial news services, databases, trading systems, etc; map created/collected data into a standard record format, and route formatted records to the output queue; and broadcast or otherwise forward, make available, or distribute streamed data records from the queue to one or more client systems, preferably while compiling a source record sequence listing and archiving copies of all streamed records for later use in data monitoring and error checking. Optionally source output processes 601 further identify records for transfer to requesting users, map identified records according to user requests, and cache records until the users are ready to receive them. Upon user request, stream source output processes also optionally resend requested portions of the data stream.

Source stream input processes 602 provide for reception of data forwarded by client processes 500, preferably while compiling a sequence listing and archival record of incoming data records; and maps the received records into format(s) compatible with the application(s) for which the data is intended. Thereafter the source-associated applications process the data records as input.

API client server table or listing processes 501 receive requests for delivery of selected data record types, and optionally mapping requests, from specifying users, administrators, or other designating sources. Processes 501 compile these requests into a table of user selections and mapping requests for use in processing data records received in the data stream received from source.

Client server incoming stream processes 502 establish a connection, subject to client server process control 507, with the stream source; receive the data stream, compile an archival copy and a sequence listing of received data records; compare all received data records to selection designations made by the users, as for example by comparing record type code elements to elements listed in a master listing of user requests; map identified data records into a form or forms, if any, designated by each requesting user; forward identified and mapped data records to caches designated for each of the requesting users; and periodically, or at the request of a client administrator or other prompt, cause a comparison to be made between the client-side record sequence listing and the source-compiled record sequence listing, to ensure that all transmitted data records have been successfully received, and, if records are determined to have been missing, request resending of potentially missing data records; and, when the users who have requested the cached data records indicate (as for example by logging in to the client data distribution system) readiness to receive the records, forwards or otherwise makes available all records cached for the users. Optionally user incoming processes 502 filter received data records according to user request.

Optionally, upon detecting a failure to receive a record from source 600, or of any other failure of the client server to be able to process incoming records, data stream processes 502 cause an error message to be returned to the source output processes 601. This error message may be used by source system 600 to suspend delivery of data stream messages to client 500. Preferably records addressed to client 500 during a delivery suspension are cached at source 600 for later delivery to the client 500.

Client server output stream processes 503 establish, if necessary and subject to client server process control 507, a connection with the stream source; receive outgoing data records from the user(s) sending data back to the stream source; map received outgoing records into the standard stream format (or other format designated for incoming records by the stream source); route the outgoing records to the output queue, and forward the records to the stream source.

User listing or table processes 504 provide user interfaces and protocols (generally in conjunction with user terminal operating or control systems) for designation by users of requested data types and data mappings, and forward such designations to client server table processes 502.

User incoming stream processes 505 provide connection to the client server, indicate to client server stream processes 502 that the user is ready to receive cached data, receive data forwarded by the client server from the user cache, and process received data records according to user instructions, for example by means of database or spreadsheet programs or filtering prior to inputting records to such applications.

User output stream processes 506 provide connection to client server output processes 503 (if a connection is not already established by processes 505), and gather and forward to client server processes 503 outgoing records for use by stream source applications, for example financial trading data prepared using spreadsheet or database programs and intended for use in trading systems associated with the stream source.

Figure 5:
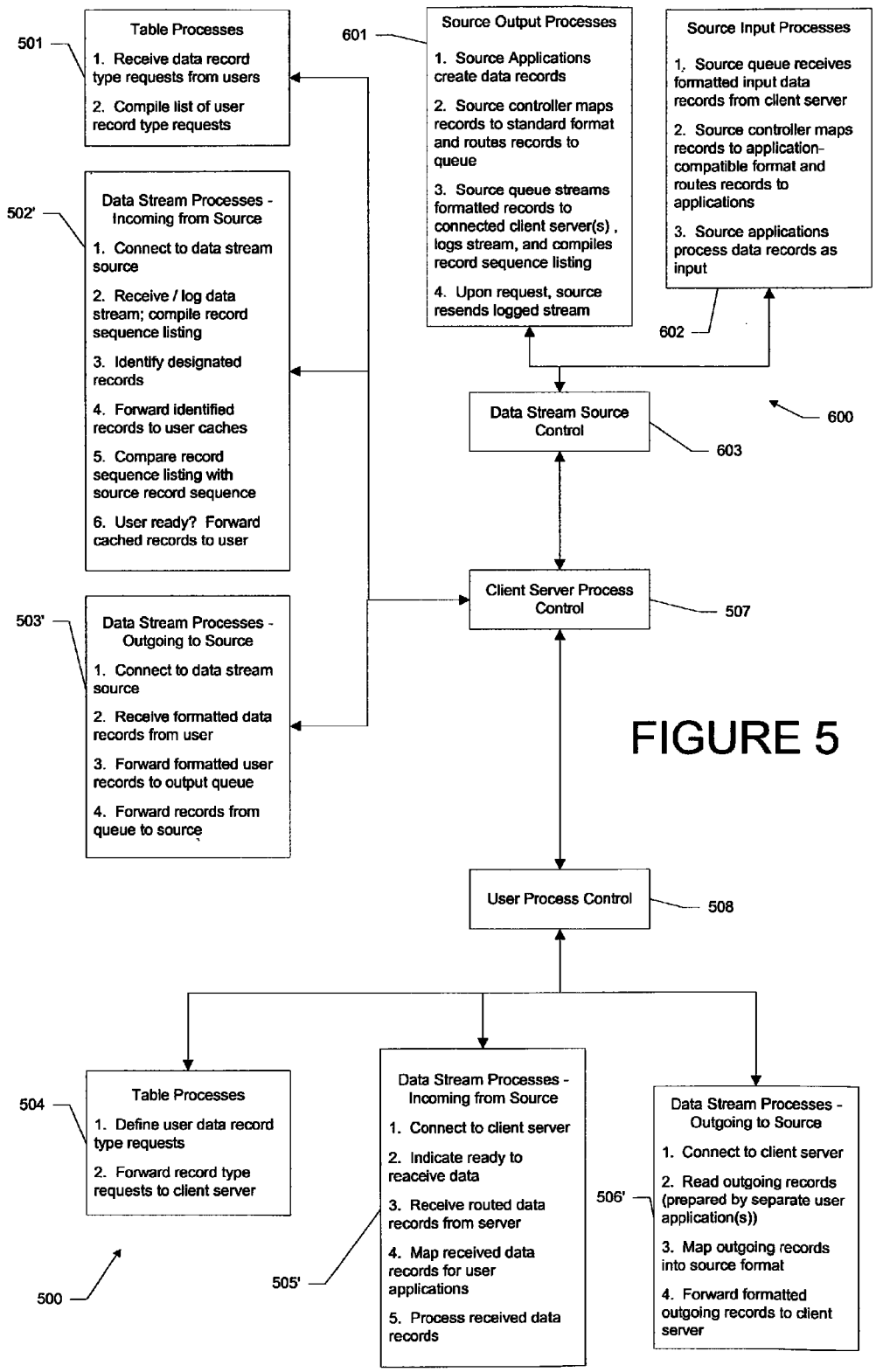
FIG. 5 is a functional diagram of a program structure for streaming, distribution, and mapping of data according to the invention.

FIG. 5 is a functional diagram of a program structure for streaming, distribution, and mapping of data according to the invention. The program structure of FIG. 5 is generally similar to that of FIG. 4, except that mapping of data records according to individual user designations is effected by program structures, including for example processes 505', 506' associated with the user terminal in lieu of the client server.

A system for mapping and distribution of financial data according to FIGS. 1a and 2-5 comprises the BLOOMBERG FIX CLIENT SERVICES API program structure (BFCA) 500 installed within a client local-area network (LAN) 102 and configured for trading of financial interests by a financial trading services institution, such as a large institutional brokerage firm. The client system 102 is connected to the Bloomberg L.P. financial data services system, providing connections/access to one or more of Bloomberg L.P.'s application systems, including particularly the BLOOMBERG POWERMATCH® trading system, which acts as a source 101 of a stream of financial data, via the proprietary Bloomberg electronic communications network (ECN). The client LAN system is adapted to receive data from the Bloomberg data stream, process the data, and return data as input to the Bloomberg systems for use in trading financial interests.

The BFCA program structure 500 is installed in two tiers: a FIX client server application, which comprises processes 501, 502, 503 is installed at a specific, server class, designated system 105. This client server system is known as the "Bloomberg FIX Client." BFCA program structure 500 also comprises FIX user applications 504, 505, 506, referred to collectively as the "Bloomberg FIX Application," installed on as many individual trader terminals 106, 107, as the client financial institution desires.

Server 105 comprises at least 128 Megabytes of random access memory (RAM), at least one Pentium 3 or better processor, and at least 40 gigabytes of memory useable for storing data records. User terminals 106, 107 preferably comprise Pentium-class processors, at least 35 Megabytes of RAM, and hard drive (or other available memory storage) capacity of at least 500 Megabytes.

Client server control processes 507 comprise the Microsoft Windows NT Service Pack 6.0 or later. User terminal control processes 508 comprise the Microsoft Windows 9x, Windows NT Service Pack 6.0, Workstation Version 4, SP 6 and/or Windows 2000 Professional SP 1 operating systems. API programming structure 500 is programmed partly in the Visual Basic programming language, as macros compatible with and operable within the intended user application (e.g., the Microsoft Excel spreadsheet/database program. Communications between the stream source and the client server comport with TCP/IP standards; routing of selected data records from the client server to user caches comports with UDP standards.

Client server processes 501, 502, 503 are encoded in an executable program structure named fixcli.exe. User processes 504, 505, 506 are encoded in one or more dynamic link libraries named bbfixclient.dll.

Through client server processes 501, 502, 503 BFCA program structure 500 enables client server 105 to act as a store-and-forward service that runs on the individual firm's LAN. Client server 105 acts as the end point for all FIX communication with the BLOOMBERG Systems within the client firm. It also serves as a cache device that can store messages for individual traders who are not currently logged in to the system by providing separate partitioned memory areas in a joint memory device, assignable during the user log-on process at the beginning of streaming sessions.

Successful installation allows traders at user terminals 106, 107, 125 improved flexibility, as compared to prior systems, in managing and monitoring all executed POWERMATCH trades on a specific day. The BFCA software performs the following functions:

Automatically connects to the Bloomberg database and delivers trade and other related data into an Excel spreadsheet.

Guarantees information delivery to a trader by storing (caching) data that was received in the trader's absence. The user who elects to end a particular FIX session without caching incoming data can disable this function.

Permits the trader to see the application status at any time during a FIX session. The client can request the information about the number of outstanding received data records (messages) at any time and provides the client and/or individual user with the option to either disconnect or continue a particular stream-receiving session based on the volume and importance of the information that is being delivered.

Allows the client and/or individual user to map or re-map incoming data (re-configure the "namespace" for incoming data) in such a way that each incoming data record will be mapped according to each user's own specification. This meaning may also be changed on a per-sheet basis and is automatically transported with each spreadsheet between PCs. For example, a single trader using a single terminal 106, 107 may designate more than one mapping for each type of incoming data record, for use with multiple applications or multiple operating instances of a single application.

To ensure data and system security on both the stream source (101) and client side (102), installation of BFCA program structure 500 and establishment of a connection between client and source systems 102, 101, requires entry from the client side, and transmission to the source, of a Fix Router IP Address (for example, an Internet or secure ECN address), a Fix Router Port identification, a Fix Client Firm ID number, and a subclient ID number (e.g., a unique ID assigned to an individual trader). Optionally additional passwords may be used/required. Optionally one or more of these identifiers and/or passwords may be stored on the client and/or individual user system(s) to ease the difficulty of logging on to begin a data transfer session. Compliance with this protocol enables the user to open a data streaming session.

Installing the BFCE Client Server Program Structure

BFCA client server program structures for Bloomberg FIX Client are provided to the client in the form of an installable program structure on a read-only memory device such as a compact disk (CD) containing an executable installation program run by invoking an executable command or script such as "Bloomberg FIX serivces.exe." Upon invoking such a command an installing operator is presented with a screen offering an option entitled "Choose Destination Locations." Upon selecting this option the operator is enabled to choose a destination location (e.g., a file "directory" on server system 105) for installation of executable programming. A default directory "c:\blp\fix" is provided but may be overridden at the option of the installing operator. Upon designation of a destination location by the installing operator the installation program structure automatically writes required program structures from the installation CD to appropriate memory locations on client server 105. Such locations are determined with the cooperation and in light of a consideration of client server operating systems and configurations.

Upon installation of necessary program structures on client server 105, the installation program presents the installing operator one or more dialog windows for configuring client-source communication protocols, both incoming from and outgoing to the source; configuring caches for individual client users; configuring individual user application parameters; and configuring FIX protocol elements. Default options are provided for all choices; the installing operator is enabled to override defaults and make custom selections tailored for the client server requirements. In configuring communications the installing operator is enabled to specify:

- a FIX router IP Address—that is, the address of the data stream source 101, such as the Bloomberg FIX service;
- a FIX router port—the port of the data stream source 101, such as the Bloomberg FIX serviced;
- a FIX Application port; the port the FIX Client 102 will monitor for calls from FIX applications; and
- a FIX Monitoring port; the port the FIX Client 102 will monitor for calls from the FIX remote monitor.

In configuring caches for individual client users, the installing operator is enabled to specify:

- A cache directory location—a directory file structure on Client Server 105 for installation of individual FIX client user files; the locations to which data records routed to individual users will be sent. Preferably this is data store location 109 with the most available free data storage space possible; a default value on the server hard drive, c:\blp\fix\cache, is provided;
- A write-through option that enables all data writings to user caches to be flushed immediately to a storage location such as data store 109; and
- A time period, optionally expressed in days, during which data will be held for individual users before the cache will be erased. As a default erasure is set to take place at approximately midnight, after a wait of 28 days.

In configuring individual user application parameters the installing operator is enabled to specify:

- an error log full path name—the name of an error log file, set by default to c:\blp\fix\logs\bbfixlog.txt. A list of error options and default settings is given in Table 1; and
- a maximum period of time allowed for any phase of data clean-up, e.g., for rewriting or erasing data archives, preferably expressed in milliseconds of processor time.

TABLE 1

| Level | Default | Description |
| --- | --- | --- |
| Error | ON | Serious errors that will affect all customer sessions are logged. |
| Warning | ON | Errors that will only affect one customer session are logged |
| Information | ON | All client Connects and Disconnects are logged. |
| Debug | OFF | All Server state changes are logged. |
| Upstream Inbound | OFF | All messages coming in from the Bloomberg FIX service are logged. |
| Upstream Outbound | OFF | All messages sent to the Bloomberg FIX service are logged |
| Downstream Inbound | OFF | All messages received from all User Applications are logged |
| Downstream Outbound | OFF | All messages sent to all User Applications are logged |

In configuring FIX protocol elements the installing operator is enabled to specify:

1. a FIX Client Firm ID—the name of the FIX client recognized by the data stream source;
2. the Bloomberg FIX Service ID—the name of the Bloomberg FIX service, as defined by the data stream source. A default of "BLP" is provided;
3. a test request ID—the name for the Bloomber FIX Service transmitted as a part of FIX housekeeping messages; and
4. a heartbeat interval—the interval at which data stream heartbeats are sent from the FIX client.

The BFCA client server installation program structures also provide program structures for removing (uninstalling) BFCA program structures from the client system. Preferably these structures are interactive and provide instructions for use by the uninstalling operator. Optionally the BFCA application program structure may be removed through the "Add/Remove Programs" options commonly provided with Microsoft operating systems. A selectable item labeled "Bloomberg FIX Services" is provided by the BFCA program structure though interaction with the Microsoft Operating Systems for this purpose.

Similar processes enable "Bloomberg FIX Application" 504, 505, 506 to be installed on user terminals 106, 107. Complete sets of default values for receipt of data from the Bloomberg source service selected by the client are provided. Thus the system may be used by individual users without additional installation or configuration effort.

Connecting the Client Server to the Stream Source

Operation of the system for mapping and distribution of financial data according to FIGS. 1-5 is initiated by the operator of client server 105 establishing a connection with the stream source, using the various ports, addresses, and optional passwords provided to the client server process 501, 502, 503. Once the connection has been established and the authority of the client server to receive requested data has been confirmed, client server processes 501 compile or read a current listing of all user data type and mapping requests, and client server processes 502 begin to read incoming data records from the source, identifying any records requested by individual users, and mapping and routing identified records accordingly. Mapped records requested by users of currently active applications are forwarded directly to the active applications on user terminals 106, without holding in caches 110. Mapped records requested by users for inactive applications are held in caches 110 until a user logs on to client server 105 via an active application.

Preferably source output processes 601 comprise programming structures which enable a client system 105 to receive only data types the particular client system is authorized to receive. For example, a subscriber to the BLOOMBERG POWERMATCH® system would be authorized to view all or an agreed subset of BLOOMBERG POWERMATCH® data, but possibly not data related to other Bloomberg services, such as bond trading.

Initializing User Processes; Designation of Requested Data Types and Mappings

An individual user such as a trader initiates a data receiving- and sending-session from a user terminal by starting the application with which the user intends to use the data. For example, at a terminal in which the BFCA program structures have been installed, the user starts an Excel spreadsheet/database program. Upon starting the Excel program the user is presented with the interface screen display shown partially in FIG. 6. Application toolbar 701 has been modified by BFCA program structure 500 to comprise FIX session icons 702, 789, 790, 791. Selection of start icon 702 through the use of any suitable computer interface device such as a keyboard or pointing device such as a mouse or trackball causes user processes 505 to connect to the client server and establish communications with client server processes 502. Selection of configuration icon 789 allows the user to configure worksheets to achieve a custom view of received data, as described below. Selection of export configuration icon 790 enables the user to export the current configuration to another spreadsheet file. Selection of help icon 791 causes client program structure 500 to display interactive help interfaces of a type similar to those commonly available in Windows programs and adapted for explanation of the use of the Bloomberg FIX application.

The user is given two options for designating data record type requests and mapping preferences: 1) starting a new FIX session with an empty spreadsheet workbook file; or 2) opening an existing workbook file for which designations have already been made and selecting a modify mappings icon. Either option enables to the user to make both data type selection and mapping designations.

Figure 7:
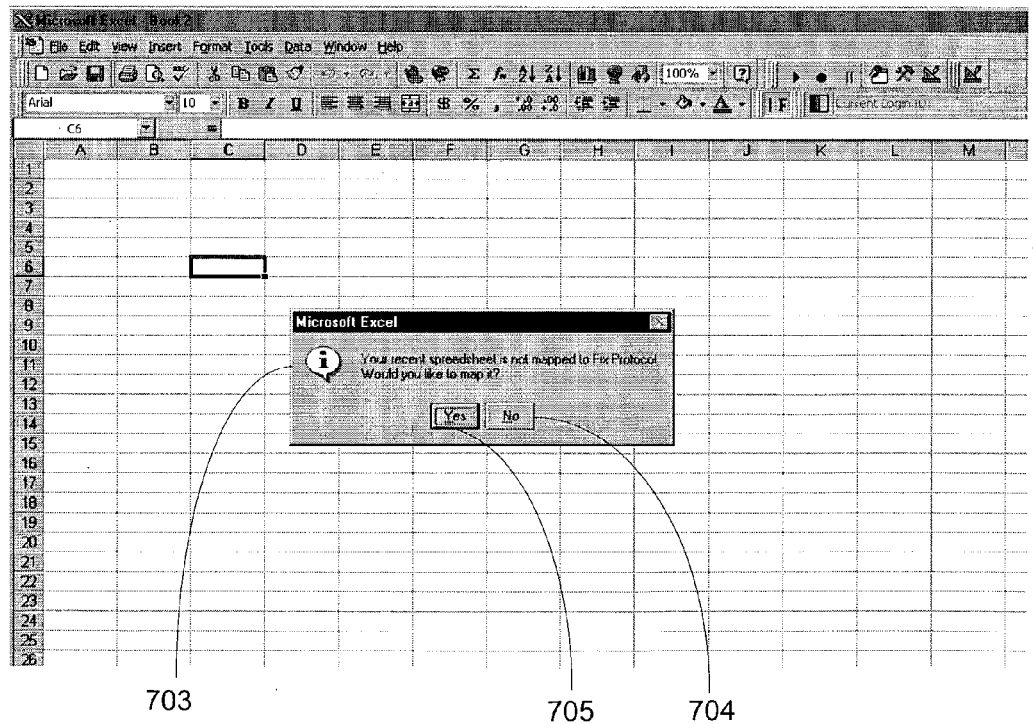

If the user starts a new FIX session with an empty workbook, or a workbook for which no selection or mapping designations have been made, the user's interface screen presents object 703 shown in FIG. 7, which comprises the message, "Your spreadsheet is not mapped to FIX protocol. Would you like to map it?" Selection of "NO" item 704 stops the Bloomberg FIX streaming session and restores the "Start Bloomberg FIX Services" item 702 to toolbar 701. Selection of "YES" item 705 results in presentation of a screen such as that shown in FIG. 8.

Figure 8:
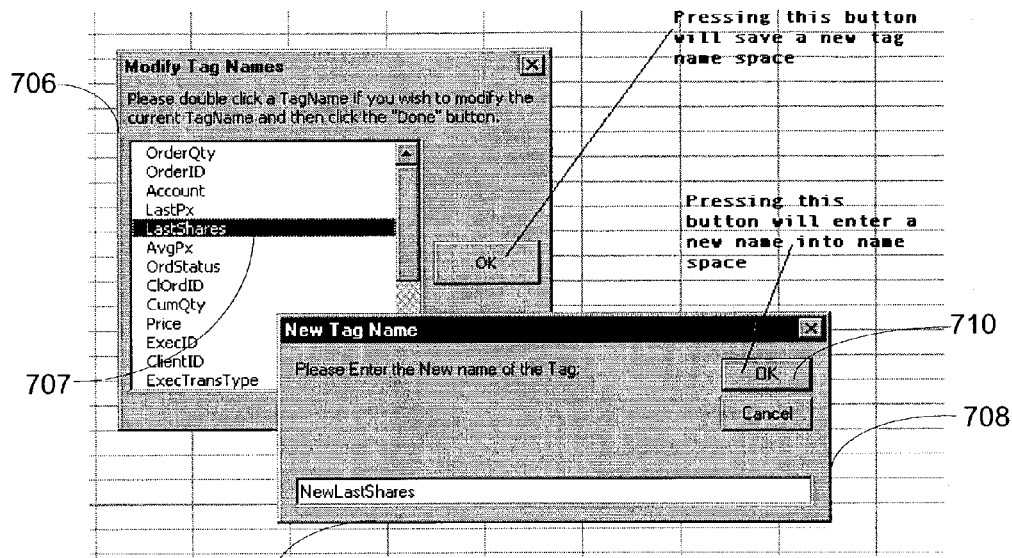

"Modify Tag Names" item 706 of FIG. 8 comprises a listing of all data types and/or items within a selected data type the user is authorized to receive. For example, some client institutions may place restrictions on the types of data individual users are authorized to receive. In the example of FIG. 8 data item tags for a data record of type "Execution Report" is shown.

Item 706 lists data item tags by default names provided by client server processes 501, 502. That is, the list provides a default mapping of a set of data items, or fields, corresponding to each data record 303 received by the client server from the data stream source of the type "Execution Report." The user may change the mapping of an item tag, for the application in which she is working, by selecting an item from listing 706, such as "LastShares" item 707. This results in presentation of item 708. To change the mapping of the data item tag the user then types a new tag in field 709 using a keyboard or other suitable device associated with the user's terminal. The change is saved locally by the user's terminal as a result of selection of "OK" item 710. This renaming process can be repeated for any number of data items. Selection of "OK" item 711 when the user has finished customizing data item tags causes the "name tag space," or listing of item tag mappings, to be saved locally for later confirmation and forwarding to for use by client server processes 501, All type code name changes are saved and supported each time the user restarts the user's application, until the user re-maps the name. Moreover, the name change affects only the particular workbook file in which the user is working, so that the user may operate multiple, fully customized applications such as spreadsheet monitors.

Figure 9:
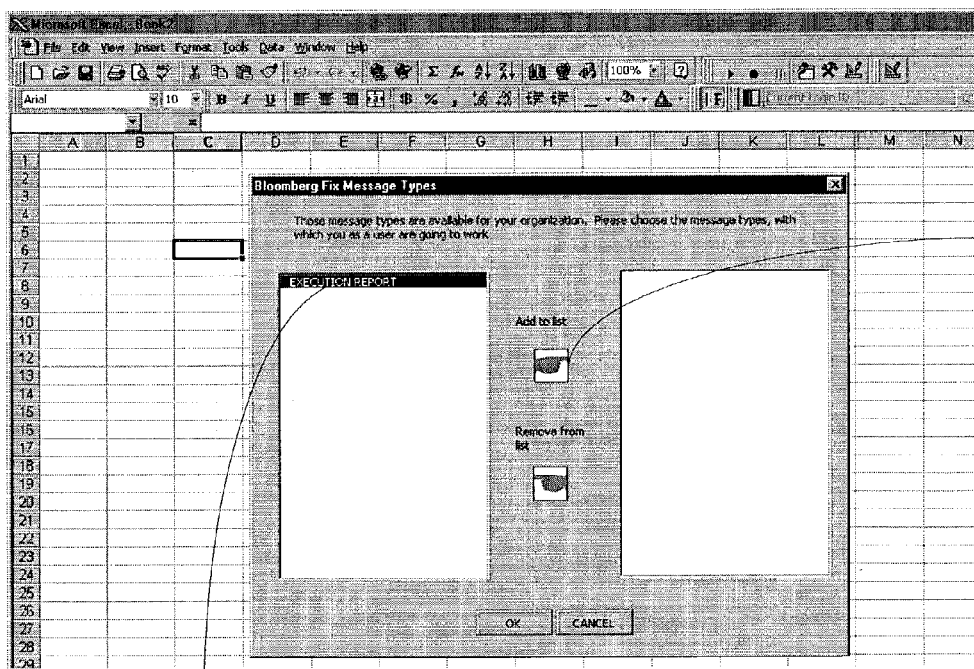
Figure 10:
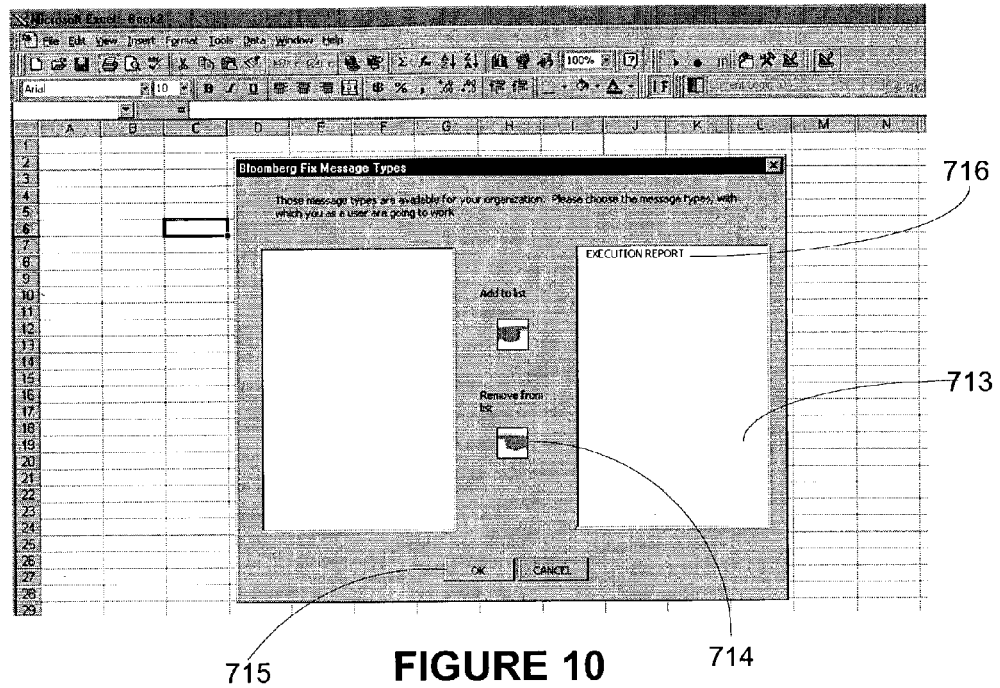

Once the user has designated the user's own names for each data type the user wishes to receive, and for each item with those data types, a list of data types or individual items, or fields, included within a designated data type is presented. A list of data types comprising a single type "Execution Report" is shown in FIG. 9. To designate one or more data types, the appropriate item 711 in the list shown, and "Add to List" item 712, are selected. This results in movement of the designated type(s) 711 to the designated item list 713 shown in FIG. 10.

A previously designated item may be removed from the designation list, if desired, by selection of item 716, and "Remove from List" item 714.

When the user is satisfied with the list of data types, selection of "OK" item 715 causes the list to be saved for forwarding for use by processes 501 on the client server.

Figure 11:
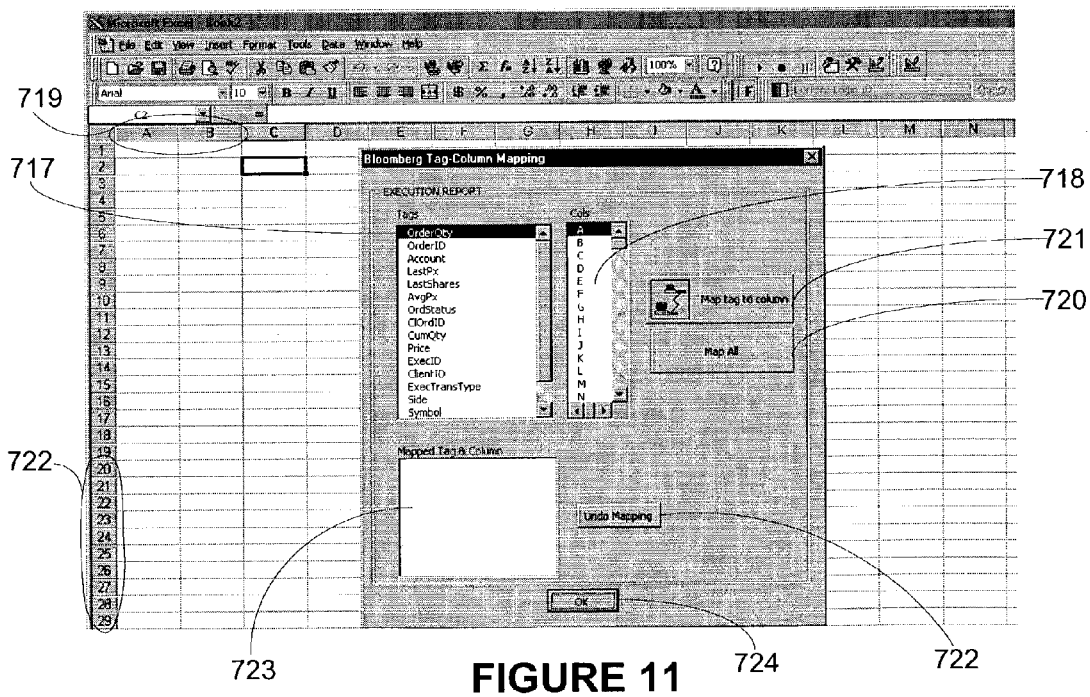

Once a desired set of data types has been designated, the user is enabled to select one of the data types for mapping of individual items (in FIX protocol, sometimes referred to as "fields") within the data record type. This results in presentation of a screen such as that shown in FIG. 11. For the selected data type a list of items or fields included within records of that type is given at 717. At 718 a list of available columns is given. Columns "A," "B," "C," . . . at 718 correspond to spreadsheet columns "A," "B," "C," . . . at 719, in which data is to be presented. As a default, items 717 will be mapped to corresponding columns 718 upon selection of "Map All" item 720. For example, selection of "Map All" item 720 in the situation shown in FIG. 11 would result in a mapping of items "OrderQty" to column "A", "OrderID" to column "B", "Account" to column "C", etc. As data is received once the streaming process has begun, each data record would occupy two rows 722 in the spreadsheet. For example, a single record of type "Execution Report" would occupy rows 1 and 2 of the spreadsheet. In row 1 would appear a list of item names, "OrderQty," "OrderID", etc., and in row 2 would appear the value of the data field for the particular record.

Figure 12:
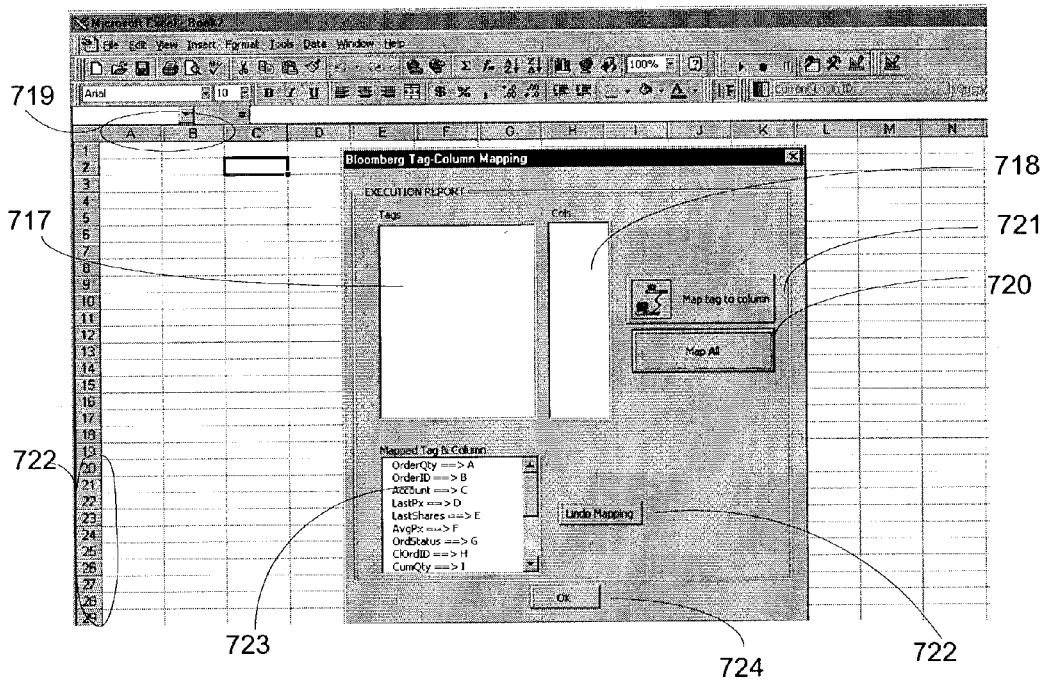
Figure 13:
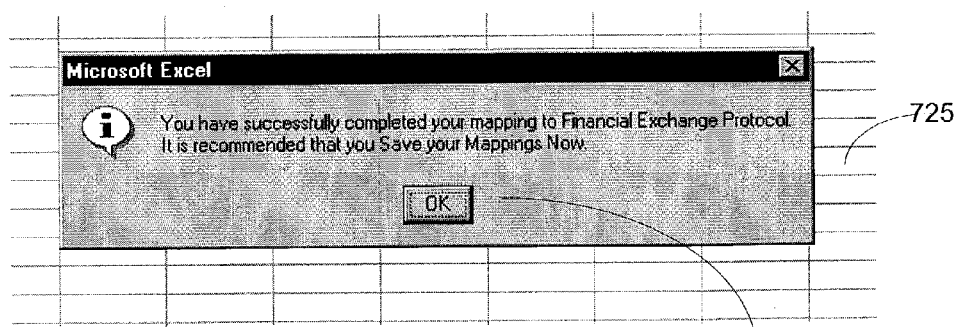

To modify column mappings, the user selects an item from list 717, item "Map tag to column" 721; and a column 718. Completed mappings are displayed at 723. As items and columns are matched, matched pairs shown at 723 are removed from lists 717, 718 until all items have been mapped, as shown in FIG. 12. When the user is satisfied with all item mappings, "OK" item 724 is selected. Selection of "OK" item 724 results in presentation of item 725, as shown in FIG. 13. Selection of "OK" item 726 causes a table or listing of all data type selections and mappings to be sent to client server 105 for use by server processes 501, 502, 503 in selecting, mapping, and routing records for the user making the designations.

The user may cancel a mapping shown at 721 by selecting "Undo Mapping" item 722. This results in a presentation of the screen shown in FIG. 11, and the user is enabled to create a new mapping.

Thus the user is enabled to filter which data records and items or fields the user would like to monitor, and to specify exactly how the user would like those data structures to be presented within the user's application. Any given record item may be mapped exactly to one column within a particular data record type. Any item may be mapped to any column without any limitations. Items having the same names but included within different data types (for example, a "Price" item in equity and bond record types) may be mapped to different columns.

Once the user has saved his record type and mapping requests, the user is not required to repeat the designation and mapping process until the user elects to remap. That is, the designation/mapping list is saved by client server processes 501 until the user elects to cancel or modify them.

Beginning a User Session

Figure 6:
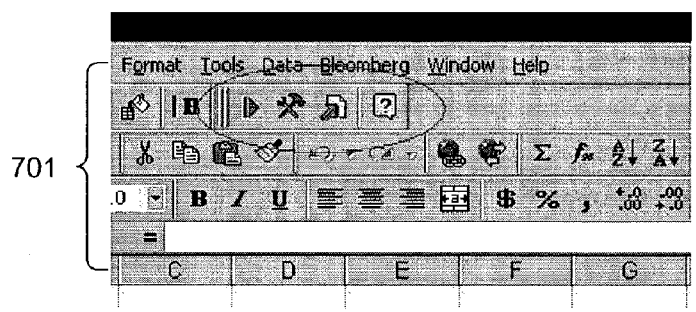

Once the user has completed the mapping progress, or upon selecting "Start Bloomberg Fix Services" item 702 in FIG. 6 with a workbook associated with a previously designated mapping, user processes 505 attempt to connect the user application to the data stream being received by client server processes 502. The status of the connection to the incoming data stream is shown in field 727 of FIG. 15, which is located at the bottom of the user application window. A "Bloomberg FIX Session" toolbar is made available on the user application toolbar and additional receive and error sheets are added to the user's application workbook. The user then begins to receive the data the user has requested.

Protocols for connection of user applications/terminals to the client server comprise confirmation by the user application of the data types the user wishes to receive, and the desired mappings of received items by writing to the client server system a message indicating that no change has occurred or a message that such change has occurred and a record including the changes. Requested data type codes and mapping requests are incorporated by client server processes into a listing of requested type codes and mappings, for use by the client server in selecting, mapping, and distributing received data records. Confirmation or setting of user requests takes place only once per session unless the user initiates a change.

In some embodiments initial identification and optionally mapping and caching are performed by the data stream source. In such embodiments the client server forwards to the stream source, when the connection is established between the server and the source, a list of all data record types requested by the users served by the client server, and optionally the total number of times each type of record is to be accessed by the users. As records of types requested by and authorized for disclosure to the users are made available to or by the stream source, they are associated with indices indicating the total number of times they may be accessed by users associated with the client server, optionally mapped in accordance with user requests, and forwarded to a cache associated with or otherwise assigned to the client server, and held for individual users. Thereafter, as each individual user logs onto the system, data identifying the user and his address are forwarded to the stream source via the client server, and data is forwarded from the client cache. As each data record is accessed or forwarded to a user, the system notes the access, as for example by decrementing a counter associated with the data record. When a data record has been accessed its authorized number of times, it is deleted, or marked for deletion during later cache clean-up operations.

Optionally records are delivered to the client server when the server is connected to the stream source, and cached for individual users at the client server level.

As data stream records are received by client server processes 502 each record is parsed. Initially the parser breaks the stream into individual data records. Each record is further broken into individual fields and associated tags. Then each record and its associated tags are marked for routing to requesting users, mapped according to user requests, and forwarded to the assigned user cache.

Figures 14, 15:
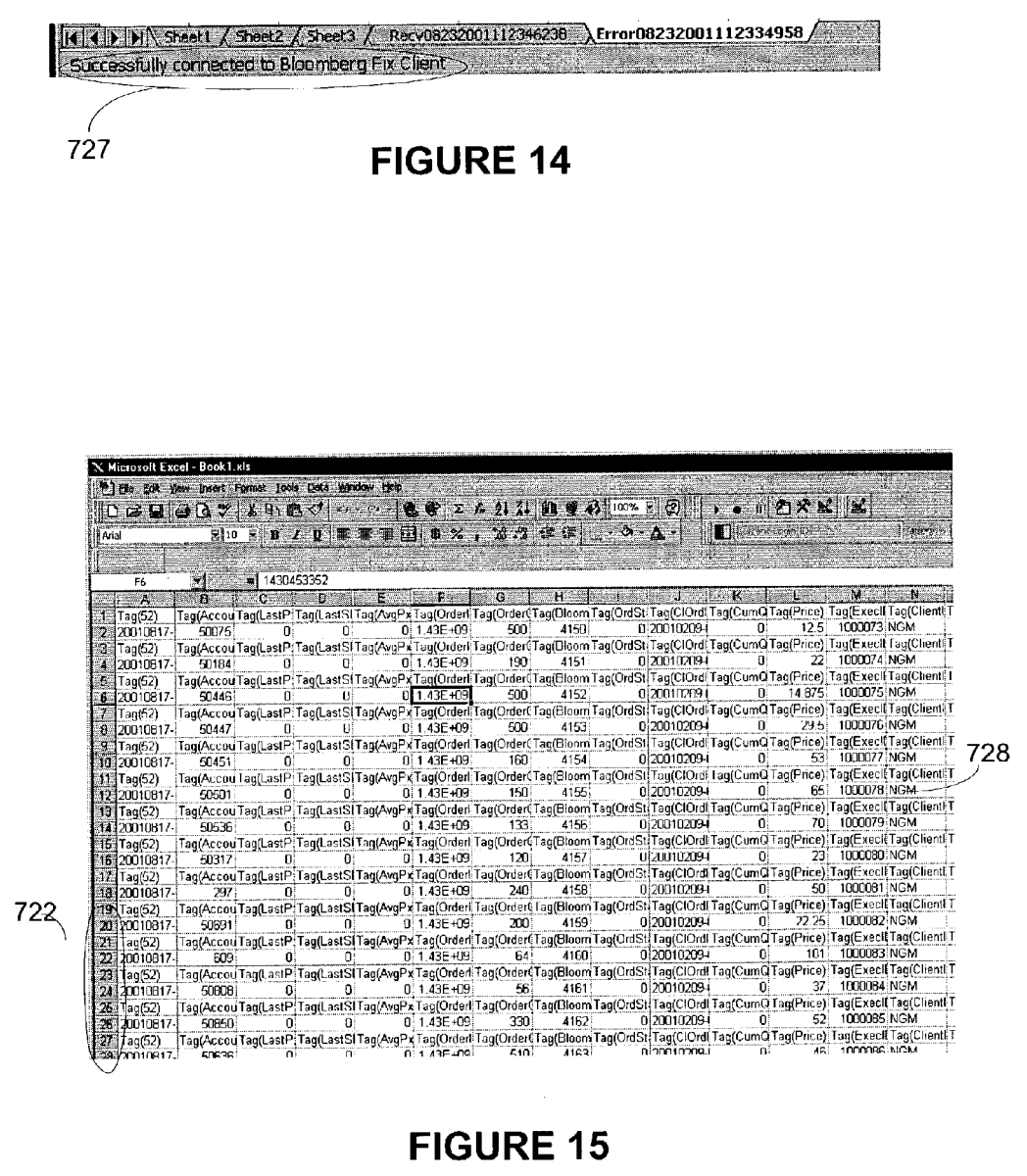

Data records routed to the user through user cache 110 begin to appear, substantially in real time, on user spreadsheet display 728 as shown in FIG. 15. Displayed records occupy two of rows 722 each, odd rows showing item tag names and even rows showing item values.

Figure 16:
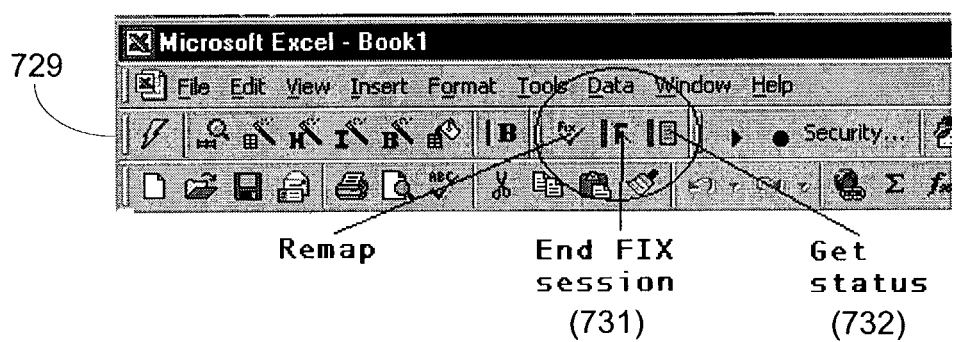
Figure 17:
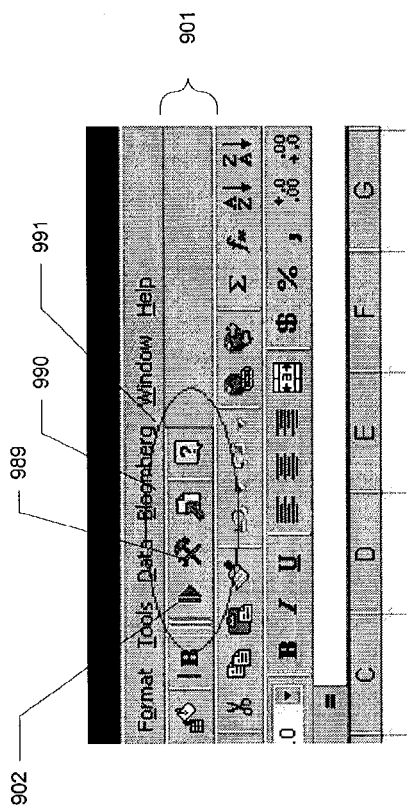

The "Bloomberg FIX Session" toolbar, shown at item 729 in FIG. 16, comprises "Remap," "End Fix Session," and "Get Status" items 730, 731, and 732 respectively.

Selection of "Remap" item 730 allows the user to modify the user's designations and/or mappings, as for example to modify the presentation of data on the user's application screen. The user selects which data record types the user would like to include in the user's spreadsheet and to designate which how the user would like items within the selected records to be mapped. The remapping process proceeds according to the description of FIGS. 7-13 given above.

Selection of "Get Status" item 732 provides the user with information concerning the number of data records the user has received, but not yet displayed, on the user's application spreadsheet during the current session.

Selection of "End Bloomberg FIX Session" item 731 enables the user to disconnect from the client server and optionally not to save in cache any data records that may be received during the user's absence.

Error Checking

Data integrity is monitored in a number of optional ways. For example, the use of data packages of set size in conjunction with sequence numbers embedded as data elements within, or otherwise associated with, each streamed data record can be used to help ensure that data records are not lost in transmission. For example, messages can be streamed from the server to client, or sent back from the client to the server, in sets of 20 data records, each set associated with a sequence number. Upon receipt of every $20^{th}$ message, the receiving system—be it the stream source for records received from the client system or the client server for outgoing records; or the client server and/or one or more client terminals 106 within a client system—checks the sequence numbers to ensure that a complete sequence has been received. If an incomplete sequence has been received, a "resend" message is sent to the sender of the incomplete data set, and the set is resent. Upon confirmation or after a predetermined period of time, temporary the message storage can be cleared. Such methods may be used in many variations. For example, a "sliding window," or buffer, of 20 messages can be maintained, with a constantly changing sequence number. The sequence number is checked constantly, or periodically, against sequence of received messages. If the sequence number does not match received messages, a "resend" message is sent.

Sequence numbers associated with data records may also be used by compiling separate sequence number listings on both the client and stream source side and occasionally sending an spurious out of sequence record. This results in the receiving side noting that one or more numbers are missing from a received sequence, and sending to the sender a request for a list of recently sent sequence numbers. If the receiving side determines that all records have not been received, it sends a resend request for range of records sufficient to cover the defective sequence.

Optionally a spurious, out of sequence record, or another deliberate indication is sent in order to trigger a resending of a data set or a listing of a most recently sent set of data records. For example, at the option of the client server client processes 501-503 may be configured to periodically or at the command of a system administrator send an indication to the stream source that an out-of-sequence record has been received, and to request a resending of a predetermined number of previously sent records, or all records sent within a selected time period, as for example all records within the most recent (or active) streaming session.

Error checking processes of these types are used between individual client terminals 106 and client server 105. In such cases each user is enabled to set error checking/confirmation parameters of the type described.

The security of client data may also be improved through the use of "look-aside" buffers. The use of such buffers is implemented by using data records of fixed length, and associating with each record a "record signature." Such buffers are maintained for a fixed length of time, such as for example, one day for systems used to store day-long trading sessions, and optionally are periodically and automatically cleared. To improve efficiency in the use of buffer space in such systems, fixed-length records may employ "gap fillers" in the place of empty or meaningless data strings.

A system for mapping and distribution of financial data according to FIGS. 1b and 2-5 comprises an alternative version of the BLOOMBERG FIX CLIENT SERVICES API program structure (BFCA) 500 installed within a client local-area network (LAN) 102 and configured for trading of financial interests by a financial trading services institution, such as a large institutional brokerage firm. The client system 102 is connected to the Bloomberg L.P. financial data services system, providing connections/access to one or more of Bloomberg L.P.'s application systems, including particularly the BLOOMBERG POWERMATCH®, TRADEBOOK®, and foreign exchange trading systems, which act as a source 101 of a stream of financial data via the proprietary Bloomberg electronic communications network (ECN). The client LAN system is adapted to receive data from the Bloomberg data stream, process the data, and return data as input to the Bloomberg systems for use in trading financial interests.

The BFCA program shown in FIGS. 17-29 is generally according to the alternative version described above, with processes 501, 502, 503 is installed at a specific, server class, designated system 105. BFCA program structure 500 also comprises FIX user applications 504, 505, 506, referred to collectively as the "Bloomberg FIX Application," installed on as many individual trader terminals 106, 107, as the client financial institution desires. User system requirements client server control processes 507, and API programming languages are similar to those described above. Additional optional mapping and filtering capabilities are provided.

Through client server processes 501, 502, 503 BFCA program structure 500 enables client systems 102 to automatically connect to the BLOOMBERG LP data feed, deliver trade and other related information into client applications such as spreadsheet programs, guarantees information delivery by caching information that was received in a user's absence (this function is overridable by individual users), and allows users to reconfigure placement strategies, or mappings, of each data record type within separate instances of the application programs, based on record type and content.

Installation and starting processes are similar to those previously described.

To designate mappings and optional additional filterings, an individual user such as a trader initiates a data receiving- and sending-session from a user terminal by starting the application with which the user intends to use the data. For example, at a terminal in which the BFCA program structures have been installed, the user starts an Excel spreadsheet/database program. Upon starting the Excel program the user is presented with the interface screen display shown partially in FIG. 17. Application toolbar 901 has been modified by BFCA program structure 500 to comprise FIX session icons 902, 989, 990, 991. Selection of start icon 902 through the use of any suitable computer interface device such as a keyboard or pointing device such as a mouse or trackball causes user processes 505 to connect to the client server and establish communications with client server processes 502. Selection of configuration icon 989 allows the user to configure worksheets to achieve a custom view of received data, as described below. Selection of export configuration icon 990 enables the user to export the current configuration to another spreadsheet file. Selection of help icon 991 causes client program structure 500 to display interactive help interfaces of a type similar to those commonly available in Windows programs and adapted for explanation of all aspects of the use of the Bloomberg FIX application.

Figure 18:
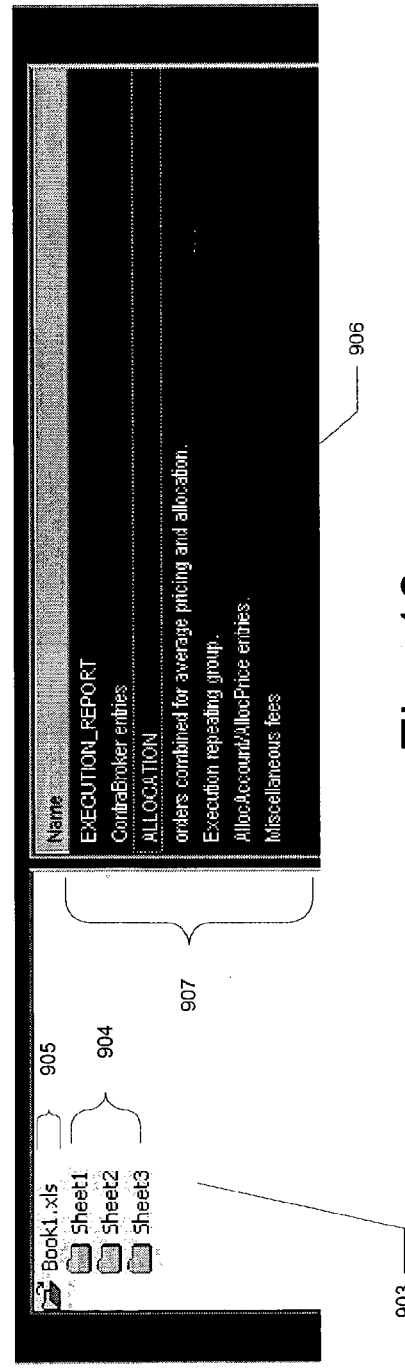

Selection of configuration icon 989 results in presentation of a screen such as that shown partially in FIG. 18. Left portion 903 of FIG. 18 comprises a hierarchical view of individual sheet data structures 904 within a larger associated spreadsheet structure 905. Right portion 906 of the Figure shows a list of FIX record types 907 available to the user. The specific record types 907 are determined by (a) the types of data the user (typically, in large trading systems, the user's firm) is authorized to receive from data source 101, as for example by subscription to the BLOOMBERG PROFESSIONAL® service (for example, a data stream of reported TRADEBOOK® trading activity. To request receipt of a desired data record type, the user selects the desired record type 907, as for example by designating the desired type with a pointing device such as a mouse, and activating a control button—for example, by selecting the right-hand button on a standard WINDOWS®-compatible mouse (by "right-clicking" the item). This results in the presentation of a screen such as that shown partially in FIG. 19 and, upon indication by the user that the user has-selected all desired data record types, is forwarded to the user's administrator or server, compiled into a consolidated request for receipt of data records (with numbers of requests for each data type), and forwarded to the BLOOMBERG® FIX-API server.

Figure 19:
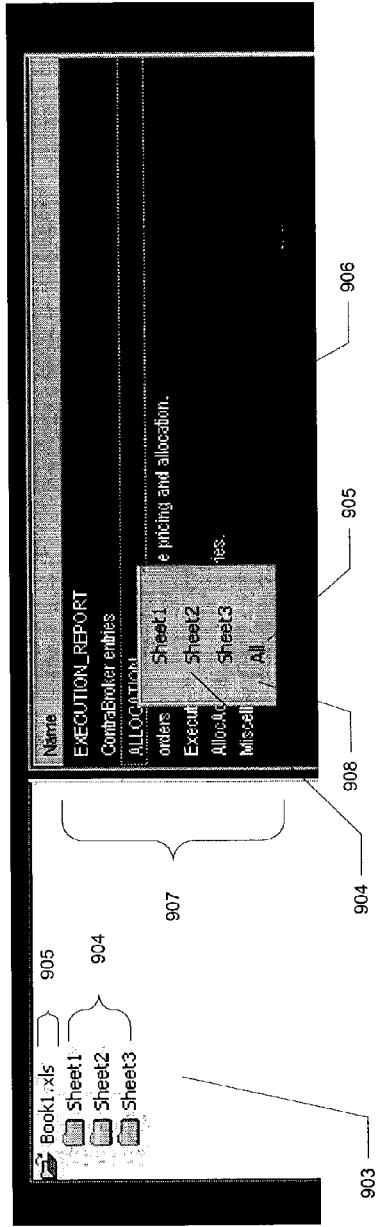

Pop-up menu 908 of FIG. 19 lists all available sheet options 904, 905, available in the active spreadsheet. Selection of desired sheets results in assignment of the selected record type to selected sheet(s). Selection of the object 904 labeled "Sheet1" results in presentation of a screen such as that shown in FIG. 20.

Figure 20:
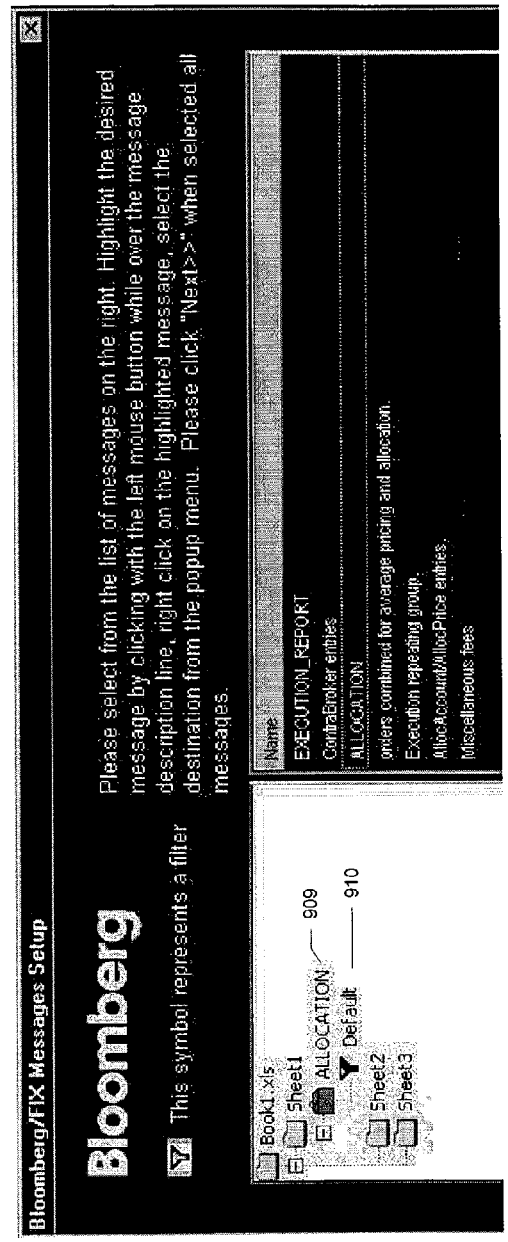

In FIG. 20 object 909 indicates that data records of type "ALLOCATION" have been designated for mapping for use in, and routing to, a data structure called "Sheet1," in a default filtering option; object 910 indicates that a default mapping option has been designated. As a default, data records designated for mapping into particular data structures (i.e., applications) such as spreadsheet sheets are mapped into the data structures in the form in which they are received from the stream source, and each instance of a data record of the designated type (e.g., "ALLOCATION") that is received is mapped into the data structure. Users are enabled to override the default and set filters for data records mapped into the data structure, however. Filters may comprise one or more designated values for items within data records. As each record is received, the values of the designated items are compared to values designated by the user. Optionally records having item values that do not match specified requests are not mapped to the designated application (or particular data structure, e.g., sheet); or only records having matching item values are mapped.

Figure 21:
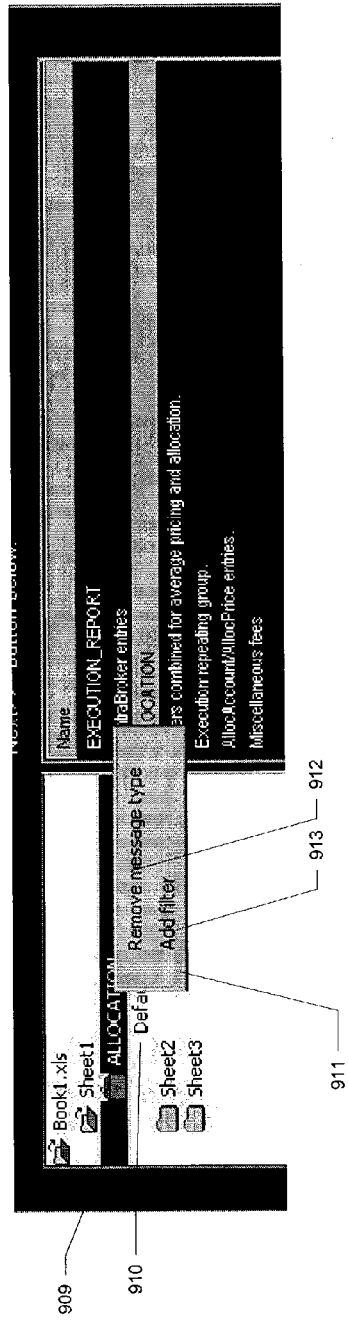

Filters may be set by selecting the desired object 909 such as that shown in FIG. 20, as for example by right-clicking the object. This results in presentation of a screen such as that shown partially in FIG. 21. Pop-up menu 911 of FIG. 21 provides the user the option of removing the data record type from the list of requested data types by selecting object 912, or of adding one or more filters for that data type by selecting object 913. Selection of object 913 results in presentation of a screen such as that shown partially in FIG. 22.

Figure 22:
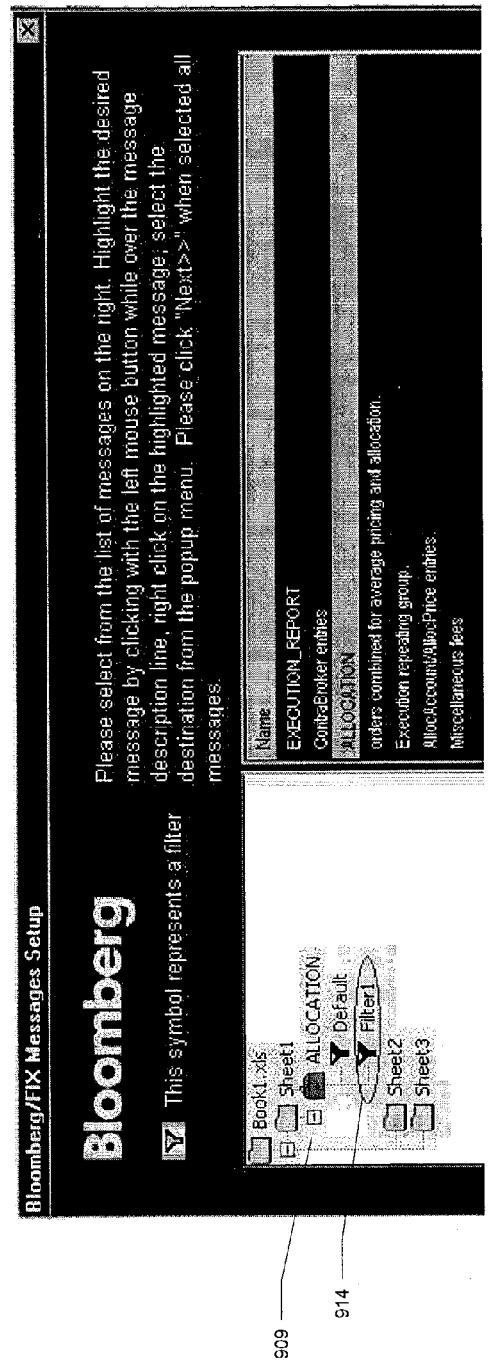

Object 914 of FIG. 22 indicates that a filter has been created for the data record type "ALLOCATION". This indicates that a separate data structure has been created for filtering all records of type "ALLOCATION" delivered to the application "Sheet1" in response to the user's requests. Filtering by comparing data item values as described may be accomplished at the user's terminal, at the user's administrative or other server, or at the stream source. In the example defined, filtering data is stored at the user's terminal and filtering is carried out as data is forwarded from the user's server.

Note that records of any type may be mapped in any arbitrary number of formats. For example, in FIG. 22 records of type "ALLOCATION" may be mapped according to two separate mappings: "Default" and "Filter1". A user may designate which mapping or mappings the user prefers to be active at any given time.

In the Bloomberg L.P. system described, both filter names (e.g., "Filter1" as shown in FIG. 22) and content may be changed. To change filter settings, the user right-clicks on the filter the user wishes to change. This results in presentation of a screen such as that partially shown in FIG. 23. Pop-up menu 915 of FIG. 23 enables users to remove or edit the designated existing filter, or to select or deselect all data items within the designated data record type. Selection of "edit filter" object 916, which enables the user to change the name and all settings for the designated filter, results in presentation of a screen such as that partially shown in FIG. 24.

Figures 23, 24:
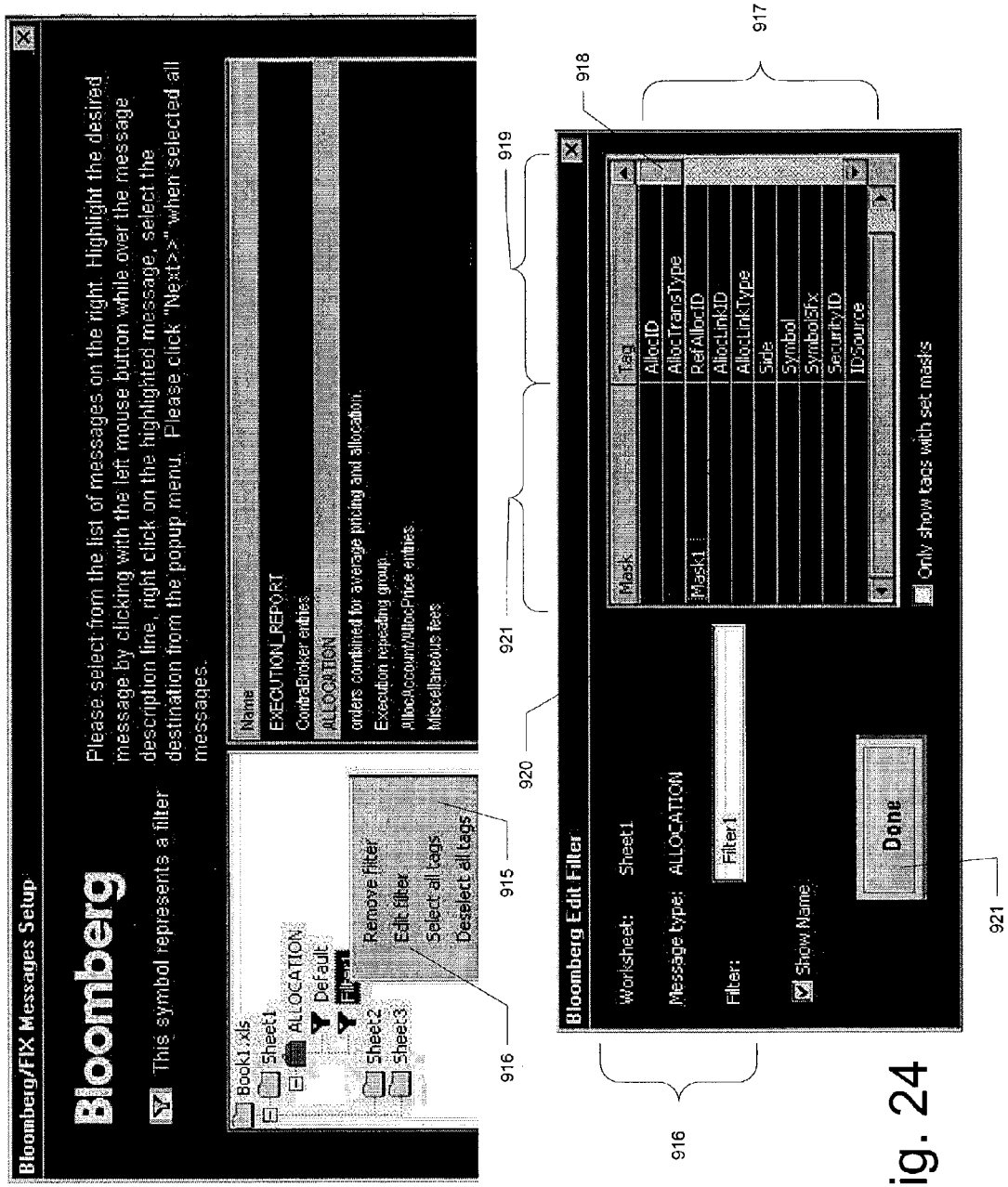

In FIG. 24 data structure/application, data record type, and filter labels are shown at 916. At 917 a list of data items associated with the selected data record type are shown. In the Figure it may be seen that data record type "ALLOCATION" comprises items, "AllocID," AllocTransType," "RefAllocID," etc. Scroll bar 918, of the standard Windows type, enables the user to access and filter additional data items within the record type. To create a filter based on one of the displayed items, the user selects the field to be used from column 919, for example by clicking on the field using a mouse or other pointing device, and types in one or more values to be used within that field as filters. For example, selecting field 920 adjacent to item tag "RefAllocID" and typing "Mask1" would create a filter that results in only data records of type "ALLOCATION" having a value "Mask1" in field "RefAllocID" being mapped to worksheet "Sheet1". Entry of more than one value in the field, separated by commas or other delimiters, results in records having both values being mapped to the designated data structure. Boolean operators such as "or," "and," "not", etc. may be used to create finely tuned filter sets. When the user is satisfied with the filter criteria, selection of "Done" object 921 causes the computer to save the filter data and associated spreadsheet, application, etc., values.

Figure 25:
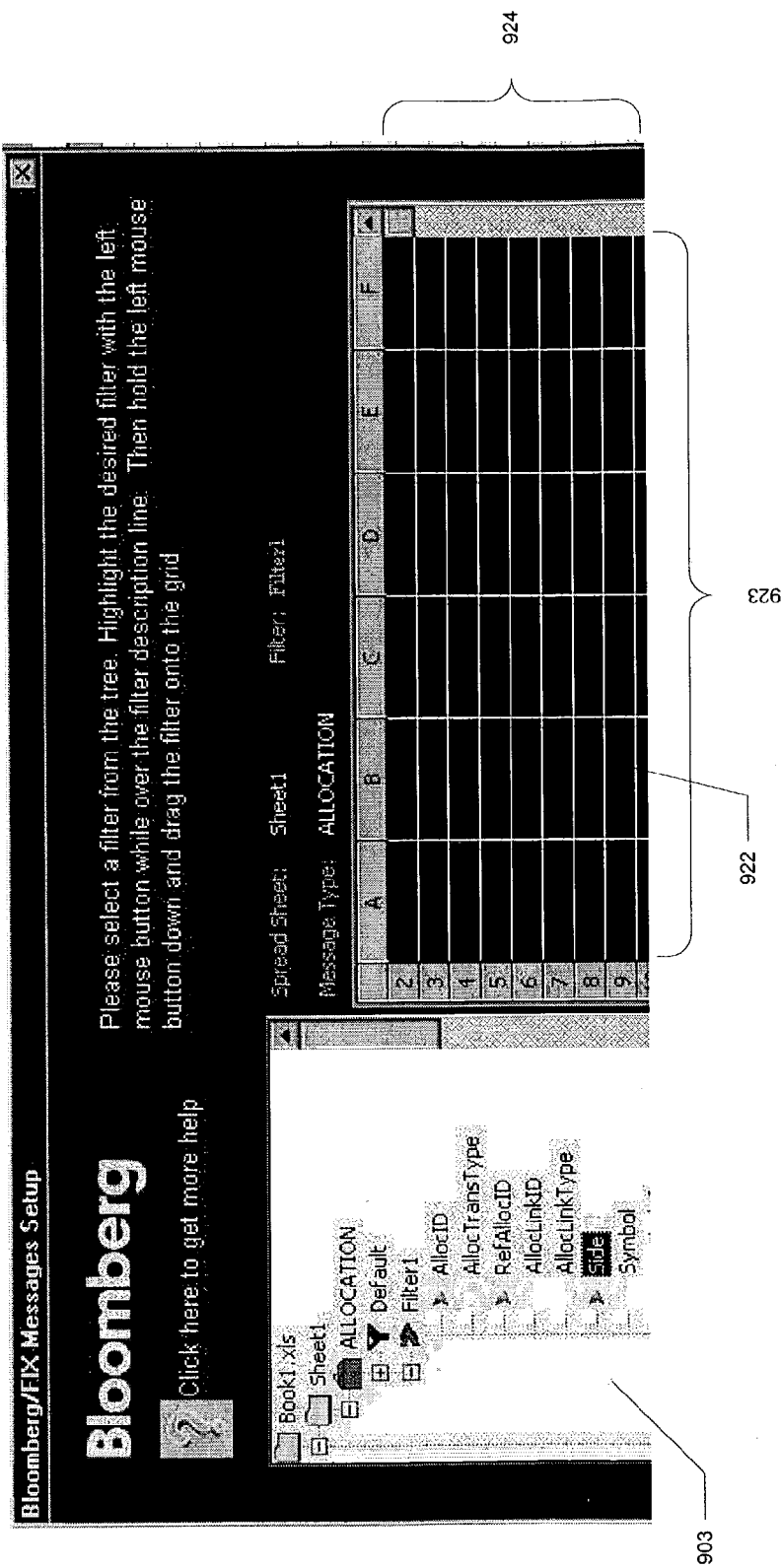
Figure 26:
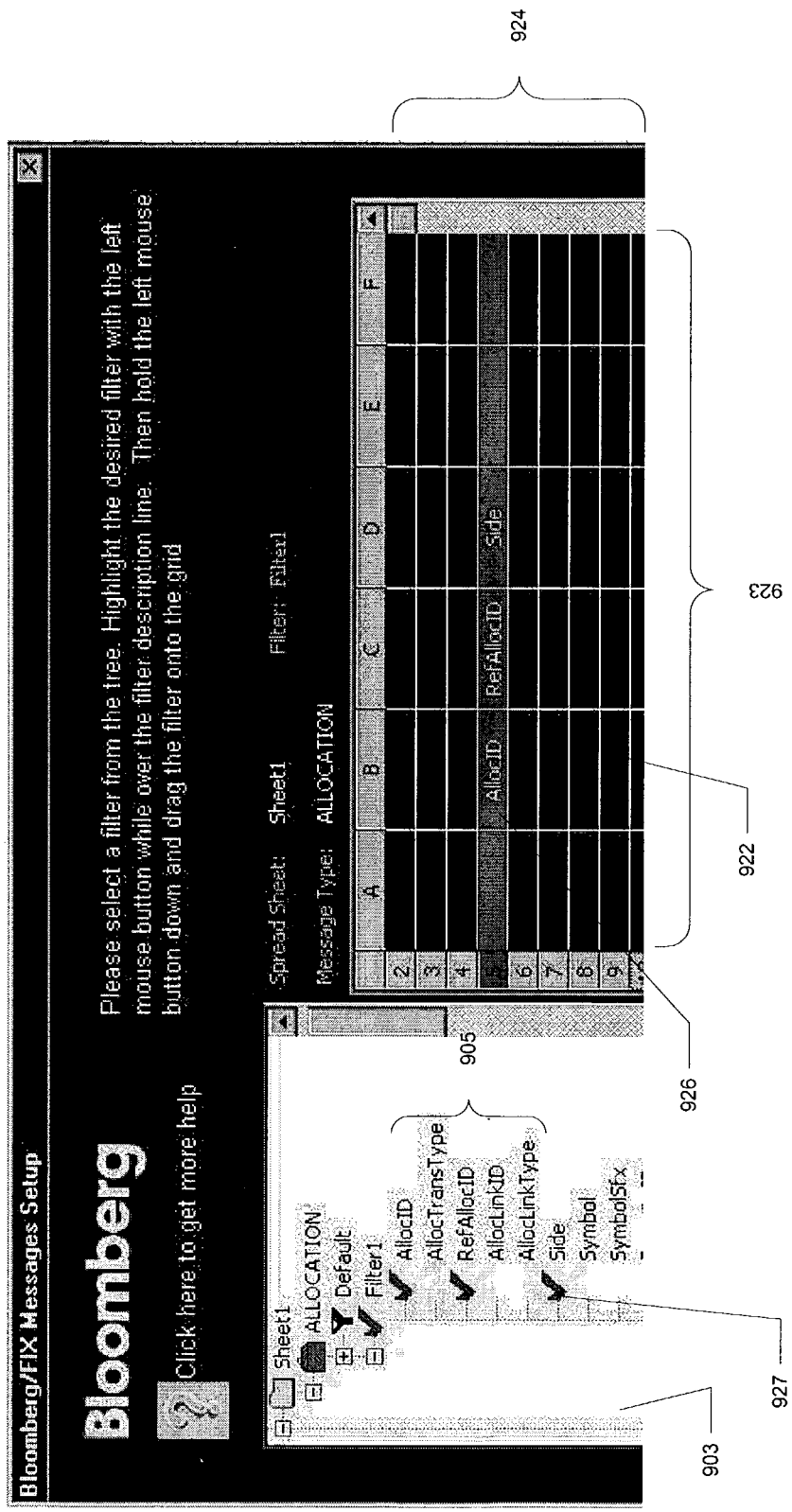
Figures 27, 28:
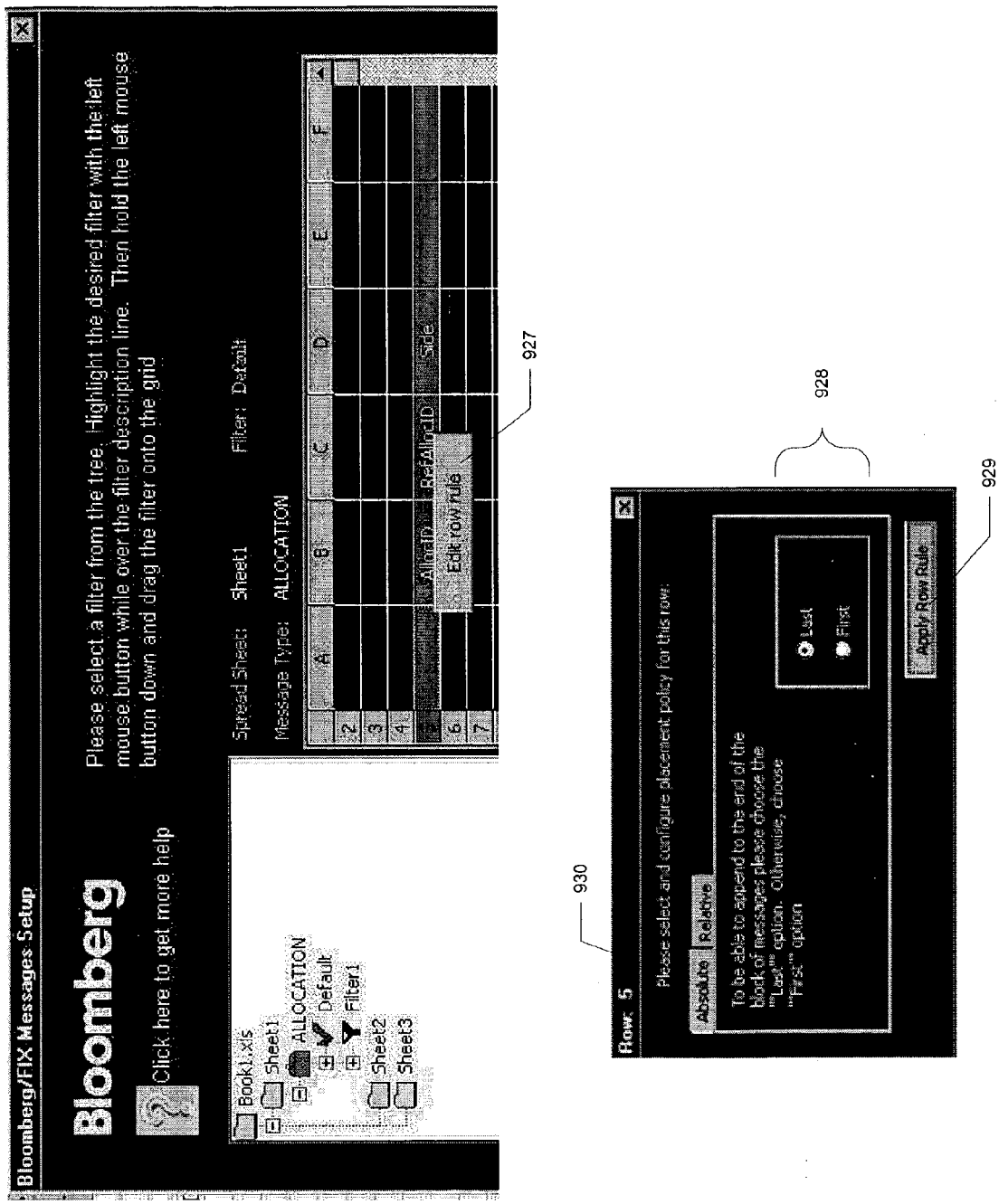

Selection of "Done" object 921 with a previously unmapped data structure active in the application causes the API to change to a data mapping mode and results in a screen such as that shown partially in FIGS. 25 and 26. In left portion 903 of the screen the active data structure, designated data record types, and filters are shown, together with tags for data items associated with the selected record type. In right portion 922 a representation of data fields associated with the active data structure (e.g., "Sheet1" in the example shown) is shown. Right portion 922 of the screen comprises columns 923 labeled A-F and rows 924 labeled 2-10. In such configurations rows correspond to various records or types of records, and columns correspond to various items within the respective record types, and therefore to the order of items within the mapped data record. Thus it is generally desirable to have at least as many columns 923 available within the data structure as the user has desired data items for a given record type.

Mapping of data records may be indicated both according to rows 924 and columns 923, to control relative and absolute position of data within the application and on the screen.

Mapping of data items to columns is entirely arbitrary; any item may be mapped to any column. To map a data item for a selected record type to a particular column 923 using a Windows type pointing device such as a mouse, the user selects the desired data item label 925 in screen portion 903 by positioning the cursor over the item and holding down the left control button. Holding the left control button depressed, the user maneuvers the cursor into the desired column 923 and preferably row 924, and releases the control button when the cursor is in the desired location (i.e., by a "drag and drop" operation). Mapping is confirmed by presentation of the item label as shown at 926. Column placement is arbitrary, and a given item may be mapped any number of times, from zero upward. Confirmation that a given item has been mapped is also provided by display of a suitable object, such as a check mark 927, in screen portion 903. Items may be removed from particular mappings by right clicking on object 926 and selection of suitable instructions on a resultant pop-up menu. The user may map as many or as few items within a data record type as the user wishes. Upon completion of the drag-and-drop operation, either the entire set of fields, or the subset of chosen fields, for the message will appear consecutively in the grid. When the user has mapped a particular filter to the worksheet, he is still allowed to move the tags by dragging them within the mapped (locked) row. Any changes made within Excel, such as column deletions and insertions, will be reflected in this screen and during normal operation with the data feed.

When data is mapped to data structures for applications such as spreadsheets, items may be mapped to either absolute or relative positions in rows. Absolute placement results in new data starting at an absolute row value and as a result of an earlier drag/drop operation. The original row reference is shown on this screen as part of the title. This example pertains to row number 5. The absolute row reference can be treated as a pivot point where new data is either appended to the end of a block originating from this point or inserted at this row value, pushing older data towards the bottom of the spreadsheet. This switch alters the chronological ordering of data within the spreadsheet.

To map data into absolute positions within rows, the user places the cursor over any row or column cell in portion 923 and right-clicks. This results in presentation of a screen such as that shown partially in FIG. 27. Selection of "edit row rule" object 927 in FIG. 27 results in presentation of a pop-up object such as that shown in FIG. 28. The user then selects the desired option at 928 and "Apply" object 929.

While this absolute placement option is sufficient for many cases, there may be a need to group together messages based on a common value in a specific field. For example it may be useful to group all trades by Symbol. In this case, the positioning row value is deemed to be derived from, or relative to, existing data on the sheet. Thus the relative placement object is selected by left-clicking "Relative" object, or tab, 930. This results in presentation of a menu such as that shown in FIG. 29.

Figure 29:
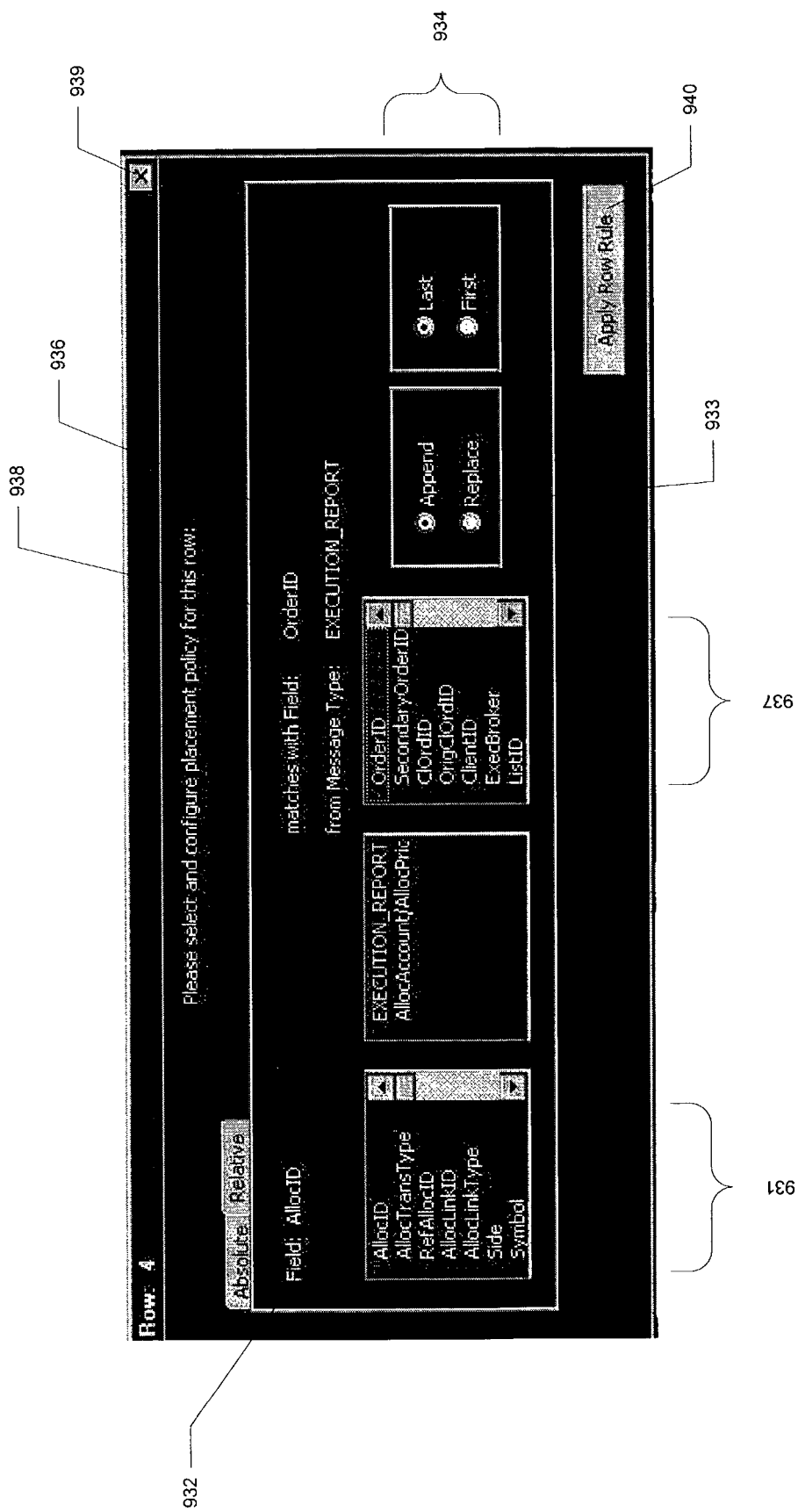

In the system exemplified by FIG. 29 there are two relative placement options available. The first allows the user to position data records based upon their own context, while the second allows the user to position records based upon the context of different records. Both options require designation a key data item label. The data structure within the application to which received data are to be written (e.g., a target spreadsheet in Excel) is searched for a designated value in the designated item in incoming data records. If the designated value is found, that data item becomes the pivot point for subsequent placement. If the value is not present in the sheet, the original placement row obtained from the drag/drop operation is utilized as the pivot point. Once a pivot point is evaluated, the layout logic is similar to that for absolute placements. Messages may be inserted at the beginning or end of a logical grouping.

To map a record into a data structure based on its own context, the user selects from column 931 the label for the data item to be used as a placement filter. The selected label is shown in location 932. The user is then given at 933 the option of appending incoming records to data already within the application data structure, or of replacing them; and at 934 of placing appended records in the last or first place within the data structure, or of replacing the last or first record within the data structure.

To map a record into a data structure based on the context of another record, the user selects from column 931 the label for the data item to be used as a placement filter. At column 935 the user selects which type of data record is to be used as a comparison in filtering. The selected record type is shown in field 936, and the labels for all of the data items available within the selected record type are shown in column 937. Selection of record type "EXECUTION_REPORT", for example, causes the labels for each of the data items within that record type to be shown at 927. The user then selects one of the available item labels for use in comparison. The selected item is shown at 938. Again the user is enabled to select placement and appendage or replacement of data at 933, 934.

The user can cause a data record to be placed statically within a displayed data structure by selecting the "replace" option at 933 in a relative placement strategy.

Thus the invention comprises programming, methods, and systems which enable a user to specify portions of display screens in which data records or items are to be displayed, and to control the manner in which they are displayed.

As will be understood by programmers and others having ordinary skill in the art of designing and implementing such systems, selectable mapping of data records and/or data items within data records to specific absolute or relative locations within data structures such as spread sheets, useable by applications for which the data is intended, may be accomplished, for example, by assigning to mapped records and/or elements static or dynamic addresses associated with the data structures.

When the user has entered all desired row mappings, changes are saved by clicking the "Apply Row Rule" button 940. Changes may be canceled by clicking on the "x" button 939 on the top-right corner.

All mapping data, including filtering instructions, may be exported independently of any received data, and used within a new data structure such as a new spreadsheet. This is accomplished by selection of export object 990 (see, e.g., FIG. 17) in the toolbar.

Software components and applications embodying the invention can be distributed in electronic bit storage on magnetic, optical, bubble, or other media, and optionally in transportable form to be interactive with an electronic reading device, for example, on computer or optical diskettes, or may be distributed over wired or wireless networks for storage by the recipient on such media.

It will further be appreciated that such media-stored software constitutes an electronic customizing machine which can interact with a magnetically or optically cooperative computer-based input device enabling the computer to be customized as a special purpose computer, according to the contents of the software. To cause a computer to operate in such a customized, special-purpose mode, the software of the invention can be installed by a user or some other person, and will usually interact efficiently with the device on which it resides to provide the desired special-purpose functions or qualities, but only after the selection of a certain set of configuration parameters. When so configured, the special-purpose computer device has an enhanced value, especially to the professional users for whom it may be intended.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modifications are intended to be included within the scope of the invention. Except to the extent necessary or inherent in the processes themselves, no particular order to steps or stages of methods or processes described in this disclosure, including the Figures, is implied. In many cases the order of process steps may be varied without changing the purpose, effect, or import of the methods described.

What is claimed is:

1. A computer system for distributing data in one or more data records to users of the computer system, each record comprising a data type and at least one field that is distinct from the data type, each field comprising a value, and the computer system comprising:

at least one programmable processor;
   at least one interface that is operatively coupled to at least one of the processors; and
   a computer readable medium storing instructions that, when executed by at least one of the processors, causes the computer system at least to:
      receive through at least one of the interfaces, from a first application operating on a user terminal, a filter for data records to be transmitted to the first application, the filter comprising a specification of a data type and one or more criteria that apply to at least one field;
      receive through at least one of the interfaces, from at least one data source, a plurality of financial data records, each record comprising a data type and at least one field;
      identify, from the received financial data records, data records having the specified data type and having one or more fields that satisfy the one or more criteria, for electronic transfer through at least one of the interfaces to the user terminal; and
      for each of the data records identified for electronic transfer to the user terminal, map each record in accordance with respective mapping data, stored in the computer-readable medium, that is specific to a respective application program that is operable on the user terminal;
      the mapping comprising at least one of (1) reordering fields within the record, (2) deleting at least one of the fields from the record, (3) adding one or more fields to the record, and (4) specifying a display format for use in displaying at least one of the fields of the record;
   wherein:
      mapping comprises placing fields within data records of a specified data type in an order specified for the user terminal and a first application, the first application being one of the application programs that is operable on the user terminal;
      a first instance of the first application is operating on the user terminal;

a second instance of the first application is operating on the user terminal at the same time that the first instance is operating on the user terminal; and the mapping comprises (1) a first mapping that specifies a first order in which fields are to be placed for the first instance and (2) a second mapping that specifies a second order, different from the first order, in which fields are to be placed for the second instance.

2. A computer system for distributing data in one or more data records to users of the computer system, each record comprising a data type and at least one field that is distinct from the data type, each field comprising a value, and the computer system comprising:

at least one programmable processor;

at least one interface that is operatively coupled to at least one of the processors; and a computer readable medium storing instructions that, when executed by at least one of the processors, causes the computer system at least to:

receive through at least one of the interfaces, from a first application operating on a user terminal, a filter for data records to be transmitted to the first application, the filter comprising a specification of a data type and one or more criteria that apply to at least one field;

receive through at least one of the interfaces, from at least one data source, a plurality of financial data records, each record comprising a data type and at least one field;

identify, from the received financial data records, data records having the specified data type and having one or more fields that satisfy the one or more criteria, for electronic transfer through at least one of the interfaces to the user terminal; and for each of the data records identified for electronic transfer to the user terminal, map each record in accordance with respective mapping data, stored in the computer-readable medium, that is specific to a respective application program that is operable on the user terminal;

the mapping comprising at least two of (1) reordering fields within the record, (2) deleting at least one of the fields from the record, (3) adding one or more fields to the record, and (4) specifying a display format for use in displaying at least one of the fields of the record;

wherein:

a first instance of the first application is operating on the user terminal;

a second instance of the first application is operating on the user terminal at the same time that the first instance is operating on the user terminal; and the mapping comprises (1) a first mapping that specifies a first order in which fields are to be placed for the first instance and (2) a second mapping that specifies a second order, different from the first order, in which fields are to be placed for the second instance.

3. A method of distributing data in one or more data records to users of a computer system, each record comprising a data type and at least one field that is distinct from the data type, each field comprising a value, the computer system comprising at least one programmable processor, at least one interface that is operatively coupled to at least one of the processors, and a computer readable medium storing instructions, executable by at least one of the processors to cause the computer system to carry out the method, the method comprising:

receiving through at least one of the interfaces, from a first application operating on a user terminal, a filter for data records to be transmitted to the first application, the filter comprising a specification of a data type and one or more criteria that apply to at least one field;

receiving through at least one of the interfaces, from at least one data source, a plurality of financial data records, each record comprising a data type and at least one field;

at least one of the processors identifying, from the received financial data records, data records having the specified data type and having one or more fields that satisfy the one or more criteria, for electronic transfer through at least one of the interfaces to the user terminal; and for each of the data records identified for electronic transfer to the user terminal, at least one of the processors mapping each respective record in accordance with mapping data, stored in the computer-readable medium, that is specific to a respective application program that is operable on the user terminal;

the mapping comprising at least one of (1) reordering fields within the record, (2) deleting at least one of the fields from the record, (3) adding one or more fields to the record, and (4) specifying a display format for use in displaying at least one of the fields of the record;

wherein:

mapping comprises placing fields within data records of a specified data type in an order specified for the user terminal and a first application, the first application being one of the application programs that is operable on the user terminal;

a first instance of the first application is operating on the user terminal;

a second instance of the first application is operating on the user terminal at the same time that the first instance is operating on the user terminal; and the mapping comprises (1) a first mapping that specifies a first order in which fields are to be placed for the first instance and (2) a second mapping that specifies a second order, different from the first order, in which fields are to be placed for the second instance.

4. A method of distributing data in one or more data records to users of a computer system, each record comprising a data type and at least one field that is distinct from the data type, each field comprising a value, the computer system comprising at least one programmable processor, at least one interface that is operatively coupled to at least one of the processors, and a computer readable medium storing instructions, executable by at least one of the processors to cause the computer system to carry out the method, the method comprising:

receiving through at least one of the interfaces, from a first application operating on a user terminal, a filter for data records to be transmitted to the first application, the filter comprising a specification of a data type and one or more criteria that apply to at least one field;

receiving through at least one of the interfaces, from at least one data source, a plurality of financial data records, each record comprising a data type and at least one field;

at least one of the processors identifying, from the received financial data records, data records having the specified data type and having one or more fields that satisfy the one or more criteria, for electronic transfer through at least one of the interfaces to the user terminal; and for each of the data records identified for electronic transfer to the user terminal, at least one of the processors mapping each respective record in accordance with mapping data, stored in the computer-readable medium, that is specific to a respective application program that is operable on the user terminal;

the mapping comprising at least two of (1) reordering fields within the record, (2) deleting at least one of the fields from the record, (3) adding one or more fields to the record, and (4) specifying a display format for use in displaying at least one of the fields of the record;

wherein:

a first instance of the first application is operating on the user terminal;

a second instance of the first application is operating on the user terminal at the same time that the first instance is operating on the user terminal; and the mapping comprises (1) a first mapping that is specified for the first instance and (2) a second mapping, different from the first mapping, that is specified for second instance.

5. A non-transitory computer-readable storage medium encoded with instructions that, when executed by at least one of the processors within a computer system that comprises at least one processor and at least one interface that is operatively coupled to at least one of the processors, cause the computer system to perform a method of distributing data in one or more data records to users of a computer system, each record comprising a data type and at least one field that is distinct from the data type, each field comprising a value, the method comprising:

receiving through at least one of the interfaces, from a first application operating on a user terminal, a filter for data records to be transmitted to the first application, the filter comprising a specification of a data type and one or more criteria that apply to at least one field;

receiving through at least one of the interfaces, from at least one data source, a plurality of financial data records, each record comprising a data type and at least one field;

at least one of the processors identifying, from the received financial data records, data records having the specified data type and having one or more fields that satisfy the one or more criteria, for electronic transfer through at least one of the interfaces to the user terminal; and for each of the data records identified for electronic transfer to the user terminal, at least one of the processors mapping each respective record in accordance with mapping data, stored in the computer-readable medium, that is specific to a respective application program that is operable on the user terminal;

the mapping comprising at least one of (1) reordering fields within the record, (2) deleting at least one of the fields from the record, (3) adding one or more fields to the record, and (4) specifying a display format for use in displaying at least one of the fields of the record;

wherein:

mapping comprises placing fields within data records of a specified data type in an order specified for the user terminal and a first application, the first application being one of the application programs that is operable on the user terminal;

a first instance of the first application is operating on the user terminal;

a second instance of the first application is operating on the user terminal at the same time that the first instance is operating on the user terminal; and the mapping comprises (1) a first mapping that specifies a first order in which fields are to be placed for the first instance and (2) a second mapping that specifies a second order, different from the first order, in which fields are to be placed for the second instance.

6. A non-transitory computer-readable storage medium encoded with instructions that, when executed by at least one of the processors within a computer system that comprises at least one processor and at least one interface that is operatively coupled to at least one of the processors, cause the computer system to perform a method of distributing data in one or more data records to users of a computer system, each record comprising a data type and at least one field that is distinct from the data type, each field comprising a value, the method comprising:

receiving through at least one of the interfaces, from a first application operating on a user terminal, a filter for data records to be transmitted to the first application, the filter comprising a specification of a data type and one or more criteria that apply to at least one field;

receiving through at least one of the interfaces, from at least one data source, a plurality of financial data records, each record comprising a data type and at least one field;

at least one of the processors identifying, from the received financial data records, data records having the specified data type and having one or more fields that satisfy the one or more criteria, for electronic transfer through at least one of the interfaces to the user terminal; and for each of the data records identified for electronic transfer to the user terminal, at least one of the processors mapping each respective record in accordance with mapping data, stored in the computer-readable medium, that is specific to a respective application program that is operable on the user terminal;

the mapping comprising at least two of (1) reordering fields within the record, (2) deleting at least one of the fields from the record, (3) adding one or more fields to the record, and (4) specifying a display format for use in displaying at least one of the fields of the record;

wherein:

a first instance of the first application is operating on the user terminal;

a second instance of the first application is operating on the user terminal at the same time that the first instance is operating on the user terminal; and the mapping comprises (1) a first mapping that is specified for the first instance and (2) a second mapping, different from the first mapping, that is specified for second instance.

\* \* \* \* \*